United States Patent [19]
Martin

[11] 4,097,873
[45] Jun. 27, 1978

[54] INK JET PRINTER FOR SELECTIVELY PRINTING DIFFERENT RESOLUTIONS

[75] Inventor: Van Clifton Martin, Boulder, Colo.

[73] Assignee: International Business Machines Corporation, Armonk, N.Y.

[21] Appl. No.: 773,107

[22] Filed: Feb. 28, 1977

[51] Int. Cl.² .................. G01D 15/18; G01D 15/24
[52] U.S. Cl. .................................. 346/75; 346/136
[58] Field of Search ............................ 346/75, 136

[56] References Cited

U.S. PATENT DOCUMENTS

| | | | |
|---|---|---|---|
| 3,298,030 | 1/1967 | Lewis et al. | 346/75 |
| 4,009,332 | 2/1977 | Van Hook | 346/75 X |
| 4,050,075 | 9/1977 | Hertz et al. | 346/75 |
| 4,051,538 | 9/1977 | Fox et al. | 346/75 X |

*Primary Examiner*—George H. Miller, Jr.
*Attorney, Agent, or Firm*—Frank C. Leach, Jr.

[57] ABSTRACT

An ink jet printer has a rotating drum supporting a medium to receive ink drops from ink jet nozzles arranged in first and second sets of multiple linear arrays about the circumference of the drum. Both the first set of arrays, which are equally angularly spaced from each other in the arc in which they are mounted, and the second set of arrays, which are equally angularly spaced from each other about the entire circumference of the drum, are moved axially simultaneously along the drum. By altering at least two of the velocity of the rotating drum, the transport velocity of the moving arrays, and the drop rate, facsimile resolutions can be printed by the second set of arrays. The printer also is capable of printing at a higher resolution than any of the facsimile resolutions through use of the first set of arrays. In either the higher resolution or any facsimile resolution, there is interlacing of the tracks produced by the drops from the selected nozzles. If only one of the nozzles of each of the second set of arrays is selected, any detected facsimile resolution can be printed whereas the use of a plurality of the nozzles in each array of the second set of arrays enables only one detected facsimile resolution to be printed.

19 Claims, 13 Drawing Figures

|  | 1----- | | SEGMENTS | | -----6 | |
|---|---|---|---|---|---|---|
| | 401 | 422 | 411 | 402 | 421 | 412 | 1
| | 412 | 401 | 422 | 411 | 402 | 421 | SCAN
| | 421 | 412 | 401 | 422 | 411 | 402 | LINES
| | 402 | 421 | 412 | 401 | 422 | 411 |
| | 411 | 402 | 421 | 412 | 401 | 422 |
| | 422 | 411 | 402 | 421 | 412 | 401 | 6

INK JET PRINTER FOR SELECTIVELY PRINTING DIFFERENT RESOLUTIONS

In the copending patent application of S. J. Fox et al for "Ink Jet Copier," Ser. No. 700,632, filed June 28, 1976, now U.S. Pat. No. 4,051,538 assigned to the same assignee as the assignee of this application, there is shown and described an arrangement in which a scanner scans an illuminated area such as a document, for example, and generates digital information defining an image. This information is applied through memory means to an ink jet printer to print the image on a medium.

The ink jet printer of the aforesaid Fox et al application has a plurality of nozzle arrays with each array having a plurality of ink jet nozzles arranged in a linear direction parallel to the axis of a rotating drum, which has the medium to receive the ink drops from the nozzles. The arrays are equally angularly spaced from each other in an arc about a portion on the drum so that controlling the rotational velocity of the drum, controlling the transport velocity at which the arrays are moved in the axial direction, and controlling the drop rate produces a high resolution on the medium with the tracks produced by the nozzles of the various arrays being interlaced. This assures complete coverage of the medium while preventing multiple coverage of any area on the medium or any gaps.

The present invention is an improvement of the aforesaid Fox et al application in that the same ink jet printer can be utilized to still reproduce the image at a relatively high resolution when employed as a copier while being capable of printing various facsimile resolutions. Each of the facsimile resolutions, which are less than the resolution when the printer is a copier, is reproduced with an interlacing pattern. Without the interlacing pattern, the printed image would not be an accurate reproduction.

The apparatus of the present invention produces a first facsimile resolution with a relatively high throughput of printing while obtaining a relatively wide range of resolutions with lower throughput of printing. Throughput of printing is the amount of print characters capable of being produced in a given period of time.

The present invention utilizes one or more additional nozzle arrays with the ink jet printer beyond those nozzle arrays employed in the aforesaid Fox et al application. If more than one of these facsimile nozzle arrays is employed, they must be equally spaced from each other about the entire circumference of the drum to produce the interlacing pattern. As the number of the facsimile nozzle arrays increases, the throughput of printing also increases. Thus, if two of the facsimile nozzle arrays are employed, the throughput of printing for standard facsimile resolution in which all of the nozzles in each of the facsimile nozzle arrays are employed will be twice the throughput from that when only one facsimile nozzle array is used. Similarly, if three of the facsimile nozzle arrays are used, the throughput of printing will be three times that when only one facsimile nozzle array is employed.

Each of the facsimile nozzle arrays has a plurality of ink jet nozzles arranged thereon in a linear direction, which is parallel to the axis of rotation of the drum. Each of the nozzles of the facsimile nozzle array has a larger inside diameter than the nozzles of the arrays used to produce the copier resolution to produce larger drops, which are needed at the lower resolution since the lower resolution has an increase in the spacing between the segments of the medium having the drops supplied thereto.

The number of the facsimile nozzle arrays is determined by the desired throughput of printing at the highest facsimile resolution. When printing at any facsimile resolution, only one of the nozzles in each of the facsimile nozzle arrays is employed unless the facsimile resolution is that produced by using all of the nozzles in each of the arrays of facsimile nozzles. Thus, the throughput of printing at these facsimile resolutions is proportional to the number of arrays of facsimile nozzles.

At the facsimile resolutions produced by only one nozzle of each of the arrays of facsimile nozzles, the selected facsimile resolution is produced by adjusting at least two of the velocity at which the drum rotates, the transport velocity at which the arrays are advanced along the drum in the axial direction, and the drop rate of the drops.

The horizontal (circumference) resolution is a function of the drop rate and the rotational velocity of the drum. Thus, $RESH = DR/DV$ where $RESH$ is the horizontal resolution in pels/inch, $DR$ is the drop rate to the medium in drops/second (This is not necessarily the same rate as the drops generated/second.), and $DV$ is the rotational velocity of the drum surface in inches/second.

Vertical (axial) resolution is a function of the total nozzles utilized, the transport velocity of the array of nozzles in the axial direction, the drum rotational velocity, and the drum circumference. Accordingly, $RESV = N_T \times DV/TV \times C$ where $RESV$ is the vertical resolution in pels/inch, $N_T$ is the total nozzles utilized in the particular printing resolution, $DV$ is the rotational velocity of the drum surface in inches/second, $TV$ is the transport velocity of the nozzles in the axial direction in inches/second, and $C$ is the circumference of the drum in inches.

Therefore, with the same desired resolution in both the horizontal and vertical directions and a selected drop rate, then the drum rotational velocity, $DV$, must be a specific value from the equation, $RESH = DR/DV$. With a fixed circumference of the drum and given number of nozzles, the nozzle velocity, $TV$, also is a specific value for these conditions.

As an example, a desired resolution of 100 pels/inch, a drop rate of 10,000 drops/second, a drum circumference of 9 inches, and three single nozzles spaced symmetrically 120° apart around the drum produces a drum rotational velocity, $DV$, of 100 inches/second and a nozzle transport velocity, $TV$, of .333 inches/second. This is calculated by $$DV = DR/RESH = 10,000/100 = 100 \text{ inches/second and}$$

$$TV = N_T \times DV/RESV \times C = 3 \times 100/100 \times 9 = 0.333 \text{ inches/second.}$$

If the drop rate is doubled to 20,000 drops/second by guttering only half as many drops as in the prior example, then the drum rotational velocity would have to be doubled; this would double the nozzle transport velocity. As a result, the print time would be halved.

From the equation for $RESV$, increasing the number of nozzles without changing the resolution requires an increase in the nozzle transport velocity but not in the drum rotational velocity. This is because the drum rotational velocity is solely dependent on the horizontal resolution and the drop rate.

Any change in resolution causes a change in the drum rotational velocity and the nozzle transport velocity unless the drop rate is changed. However, even if the drop rate is changed so that there is no change in the drum rotational velocity for a change in the desired resolution, there still must be a change in the nozzle transport velocity, TV. Therefore, for a given number of nozzles, any change in the resolution requires a change in at least two of the drum rotational velocity, the nozzle transport velocity, and the drop rate.

In order to have a perfect interlacing pattern with unlimited facsimile resolutions, it is necessary that only one of the nozzles per array of facsimile nozzles be utilized. The use of more than one nozzle per array of facsimile nozzles limits the number of facsimile resolutions to be produced to a resolution using all of the nozzles and submultiples thereof such as one half, one third, and one fourth, for example.

An object of this invention is to provide an ink jet printer capable of printing at a high copier resolution and at a plurality of facsimile resolutions.

The foregoing and other objects, features, and advantages of the invention will be apparent from the following more particular description of a preferred embodiment of the invention as illustrated in the accompanying drawings.

In the drawings

Figure 1:
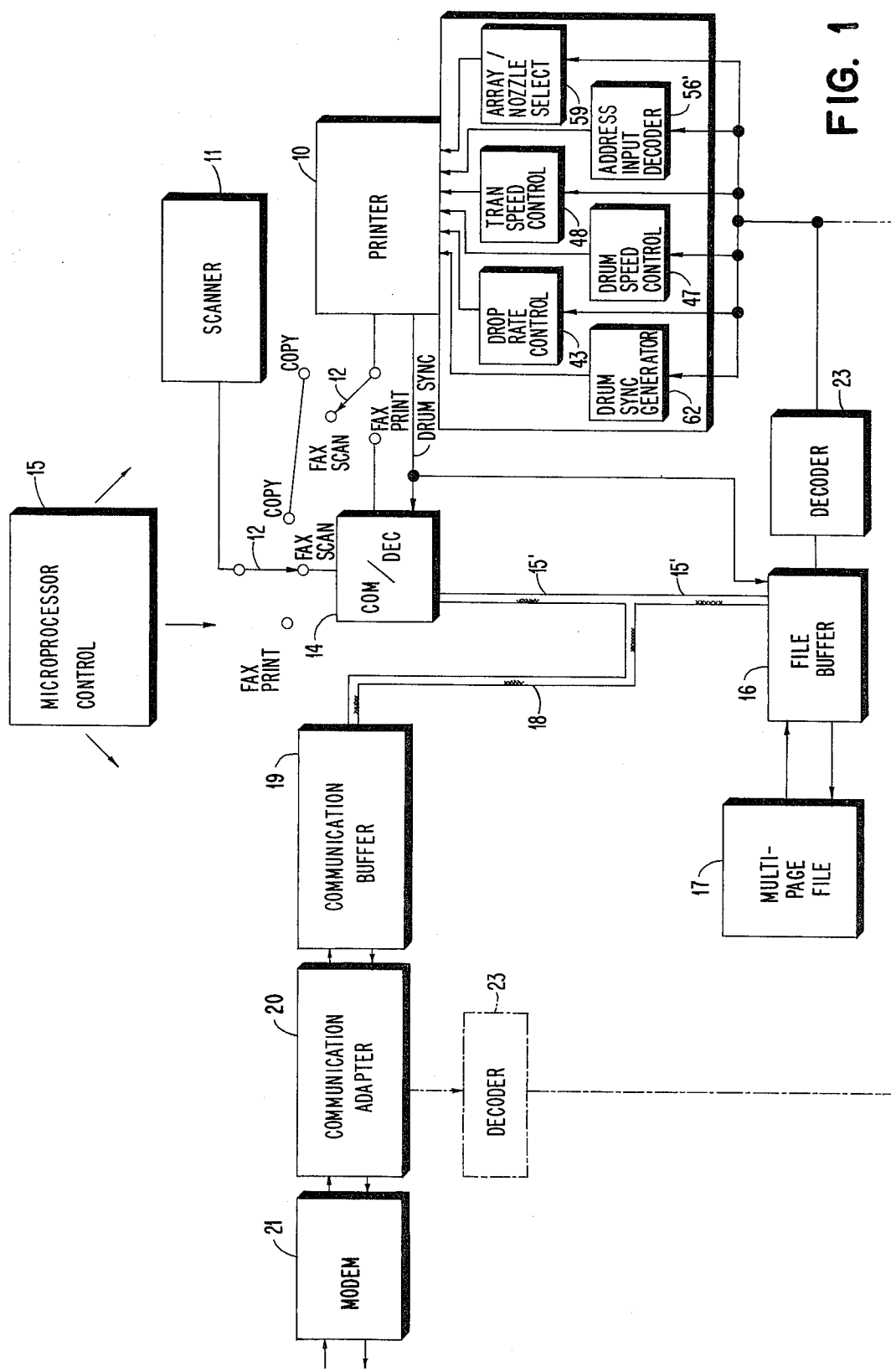
FIG. 1 is a schematic block diagram of an ink jet printer of the present invention.

Referring to the drawings and particularly FIG. 1, there is shown an ink jet printer 10 having a document scanner 11 connected thereto by a switch 12 when the printer 10 prints at a standard resolution from the scanner 11. The switch 12 is electronically controlled rather than a mechanical switch but is shown schematically as a mechanical switch.

When the scanner 11 is scanning a document during a facsimile resolution scan, the switch 12 connects the scanner 11 with a compress/decompress algorithm 14. At this time, the printer 10 is not connected to the compress/decompress algorithm or to the scanner 11.

During printing in a facsimile mode resolution, the switch 12 connects the compress/decompress algorithm 14 with the printer 10. At this time, the scanner 11 is not connected to the compress/decompress algorithm 14 or the printer 10.

The position of the seitch 12 is controlled through a microprocessor control 15, which controls all of the operations when the printer 10 or the scanner 11 is connected to the compress/decompress algorithm 14. One suitable example of the microprocessor control 15 is sold as model 6800 by Motorola.

The compress/decompress algorithm 14 may consist of run length coding, for example. The compress/decompress algorithm 14 is used to compress data, which is obtained from the document scanner 11, prior to its being supplied over a data bus 15', which can comprise eight lines for a byte, for example, to a file buffer 16. For example, only the start and stop positions for a white or black portion is supplied to the file buffer 16.

The file buffer 16 loads a multi-page file 17. One example of the multi-page file 17 is a disk file. The flow of data from the scanner 11 to the compress/decompress algorithm 14 and then to the file buffer 16 is controlled by the microprocessor control 15.

After all of the data concerning the document being scanned by the scanner 11 has been obtained and stored in the multi-page file 17, the microprocessor control 15 causes the stored data to be removed from the multi-page file 17 over a portion of the data bus 15' and a data bus 18, which can comprise eight lines for a byte, for example, to a communication buffer 19, which could be a random access memory or registers, for example. The communication buffer 19 must hold enough data to keep the communication line over which the data is being transmitted busy.

The communication buffer 19 is connected to a communication adapter 20. The communication adapter 20 controls the supply of data from the communication buffer 19 through a modem 21. When transmitting data from the communication buffer 19, the modem 21 functions as a modulator. When receiving data, the modem 21 functions as a demodulator.

The output from the modem 21 is transmitted over a communication line such as a telephone line, for example, to another device of the same type as shown in FIG. 1. Accordingly, the reception of the data will now be discussed with respect to FIG. 1 as if FIG. 1 is receiving the data. Thus, the modem 21 functions as a demodulator for the data received from the scanner 11 at the remote location.

The data is supplied from the communication adapter 20 to the communication buffer 19 and then over the data bus 18 and a portion of the data bus 15' to the file buffer 16. Then, the received data in the file buffer 16 is stored in the multi-page file 17. When all of the data has been transmitted by the communication adapter 20, the microprocessor control 15 receives a signal from the communication adapter 20 to indicate this. Then, the microprocessor control 15 insures that the switch 12 connects the compress/decompress algorithm 14 to the printer 10 prior to transmitting data from the multi-page file 17 to the printer 10. The switch 12 does not connect the scanner 11 to the compress/decompress algorithm 14 at this time.

The data in the multi-page file 17 includes fax (facsimile) mode data that indicates the facsimile resolution at which the data was obtained from the scanner 11 at the remote location. This data is transmitted to a decoder 23.

The decoder 23 decodes the fax mode data to determine which of the fax modes that the printer 10 is to operate when the data, which is stored in the multi-page file 17, is supplied to the printer 10. All of the fax modes have a different resolution than when the printer 10 is connected to the scanner 11 to function as an ink jet copier. If there is no fax mode data being supplied to the decoder 23, the decoder 23 provides an output for a standard resolution, which is when the scanner 11 is connected to the printer 10 by the switch 12.

At the time that data is transmitted from the multi-page file 17 to the printer 10, the signals from the decoder 23 to the printer 10 cause it to print at the desired facsimile resolution. This is the fax mode resolution at which the data has been obtained from the scanner 11 at the remote location.

Figure 2:
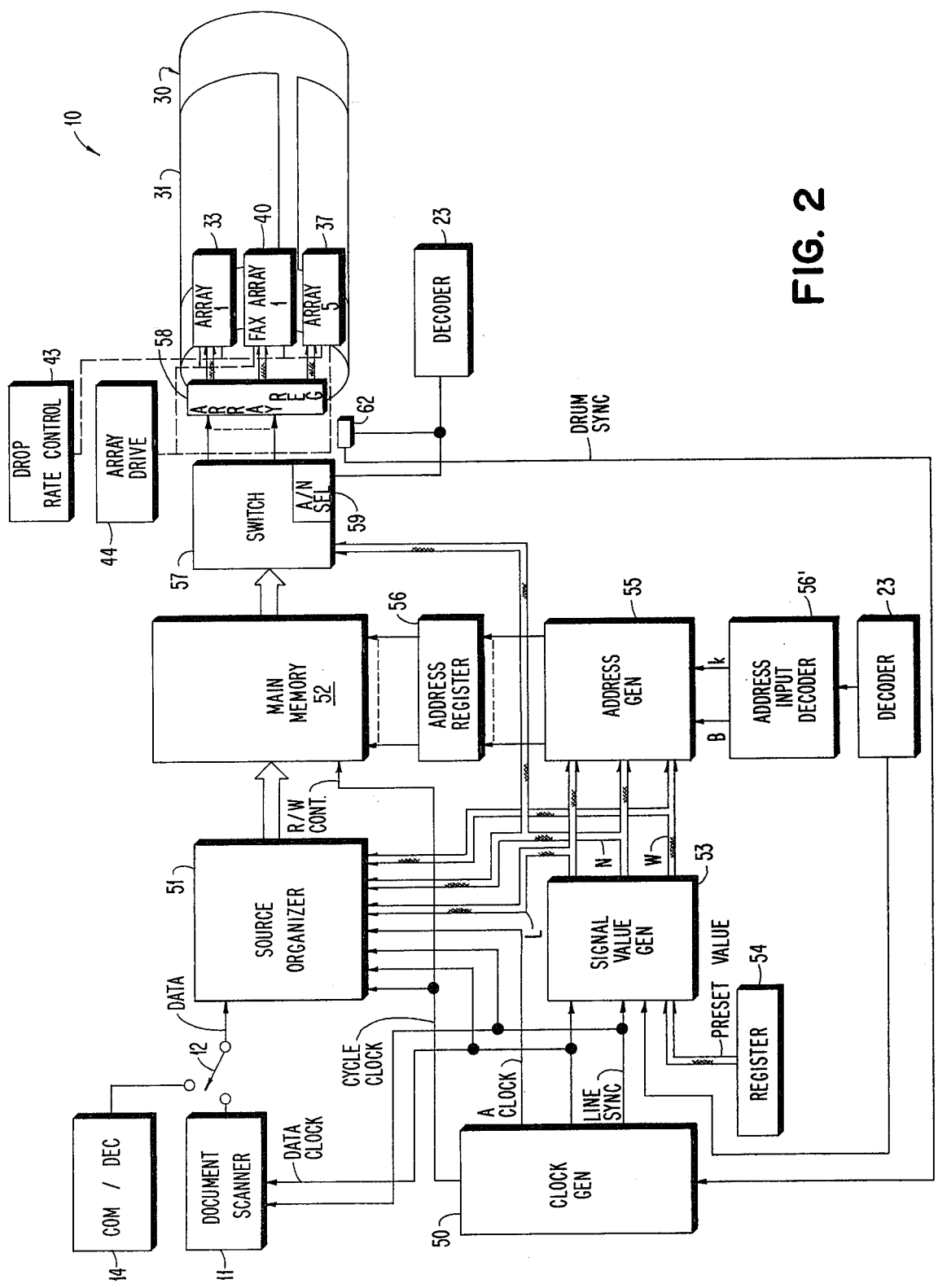
FIG. 2 is a schematic block diagram of various control elements of the printer of the present invention.
Figure 3:
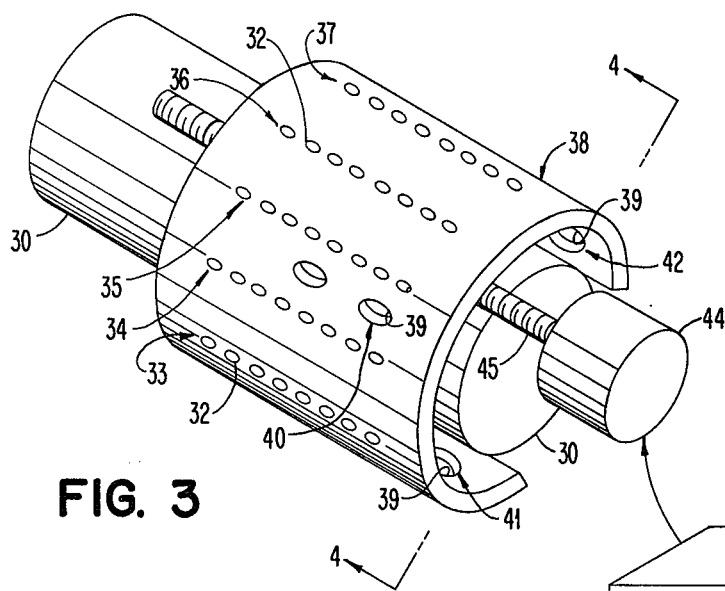
FIG. 3 is a schematic perspective view of the nozzle arrays and the drum without its rotation drive.
Figure 4:
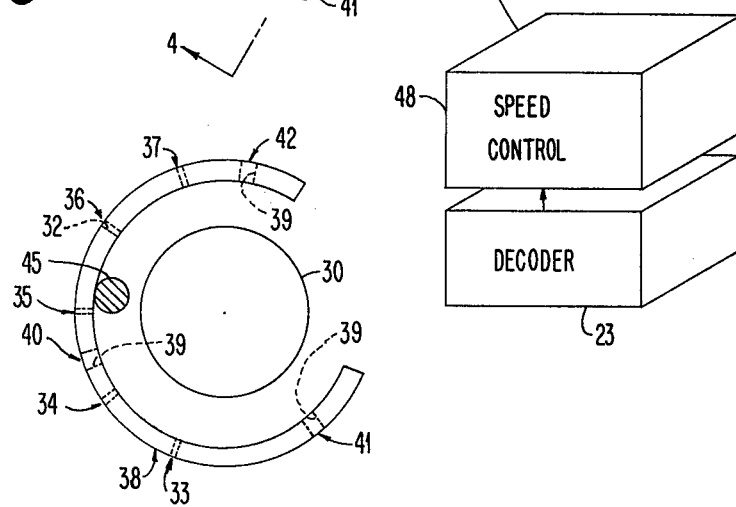
FIG. 4 is a schematic end view of the nozzle arrays and drum of FIG. 3 and taken along line 4—4 of FIG. 3.

As shown in FIG. 2, the printer 10 includes a cylindrical drum 30 having a medium 31 supported thereon to receive ink from ink jet nozzles 32 (see FIGS. 3 and 4) disposed about the drum 30. The ink jet nozzles 32 are arranged in a plurality of arrays with each of the arrays having a plurality of the ink jet nozzles 32 equally spaced from each other in the linear direction. Between the first and last of the arrays of the ink jet nozzles 32, each of the arrays is equally spaced from the adjacent arrays. The spacing between the arrays of the ink jet nozzles 32 is made in accord with the arrangement shown and described in the aforesaid Fox et al application.

As one example, the ink jet nozzles 32 are shown as arranged in five arrays 33, 34, 35, 36, and 37 with each of the five arrays 33-37 having eight of the ink jet nozzles 32 therein. Thus, a total of forth of the ink jet nozzles 32 is provided by the five arrays 33-37.

The ink jet nozzles 32 are used when a standard resolution, which is higher than any of the facsimile resolutions, is desired and the switch 12 connects the scanner 11 to the printer 10. Thus, the apparatus functions as an ink jet copier in the manner more particularly shown and described in the aforesaid Fox et al application.

The ink jet nozzles 32 are disposed in an array support 38 (see FIGS. 3 and 4), which is an arcuate sector of a cylinder extending around a portion of the drum 30. In addition to the array support 38 having the ink jet nozzles 32 of the arrays 33-37 formed therein, the array support 38 also has ink jet nozzles 39 of three fax arrays 40, 41, and 42.

The fax arrays 40-42 are equally angularly spaced from each other about the entire circumference of the drum 30 so that the fax arrays 40-42 are 120° apart. Each of the ink jet nozzles 39 has a substantially larger diameter than the ink jet nozzles 32 because of the lower resolution produced when the fax arrays 40-42 are employed.

Each of the fax arrays 40-42 can have one or more of the ink jet nozzles 39. As an example, each of the three fax arrays 40-42 has two of the ink jet nozzles 39.

It should be understood that the ink jet nozzles 32 and 39 are shown schematically supported on the array support 38. The details of the ink jet nozzles 32 and 39 and the associated control mechanisms, other than a drop rate control 43 (see FIG. 2) for controlling the drop rate, have been omitted since conventional ink jet nozzles and associated mechanisms may be employed with this invention.

The array support 38 is driven by an array drive motor 44 (see FIG. 3) in an axial direction parallel to the axis of the drum 30. The motor 44 drives a lead screw 45, which has the array support 38 mounted thereon so that rotation of the lead screw 45 is transferred into linear motion of the array support 38 in a direction parallel to the axis of the drum 30.

The drum 30 is supported for rotation about its axis by suitable structure (not shown). The drum 30 is rotated by a drum motor 46 (see FIG. 5).

Figure 5:
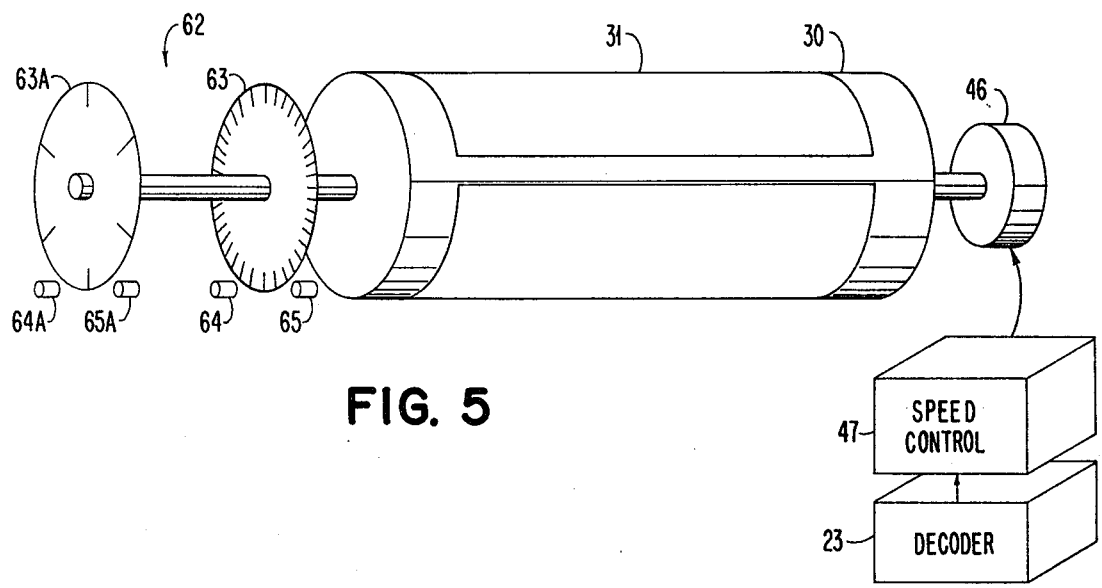
FIG. 5 is a perspective view of the drum of FIG. 2 showing its rotational drive.
Figure 9:
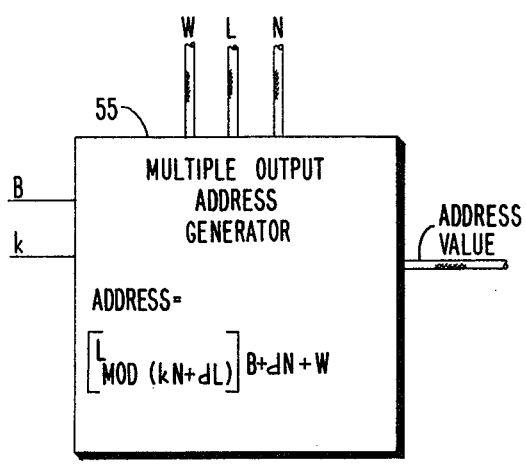
FIG. 9 is a block diagram of the address generator of FIG. 1.

The rate of rotation of the motor 46 is controlled by a speed control 47 (see FIGS. 1 and 5) which selects the speed of the motor 46 in accordance with whether the standard resolution, which is when the printer 10 is connected to the scanner 11 by the switch 12 so that the device functions as an ink jet copier, is to be used or one of the fax resolutions is to be employed. The speed control 47 receives its signal from the decoder 23 as shown in FIGS. 1 and 5.

Similarly, a speed control 48 (see FIGS. 1 and 3) is connected to the array drive motor 44 to govern its speed of rotation. The speed of rotation of the motor 44 is selected in accordance with a signal from the decoder 23 as to whether the standard resolution or one of the fax resolutions is to be utilized in printing.

As previously mentioned, the drop rate control 43 (see FIGS. 1 and 2) governs the rate at which the drops are supplied from the ink jet nozzles 32 or 39. The drop rate control 43, which receives a control signal from the decoder 23, selects the drop rate in accordance with the resolution to be printed on the medium 31 by the ink jet nozzles 32 or 39, that is, the standard resolution or one of the fax resolutions.

Figure 10:
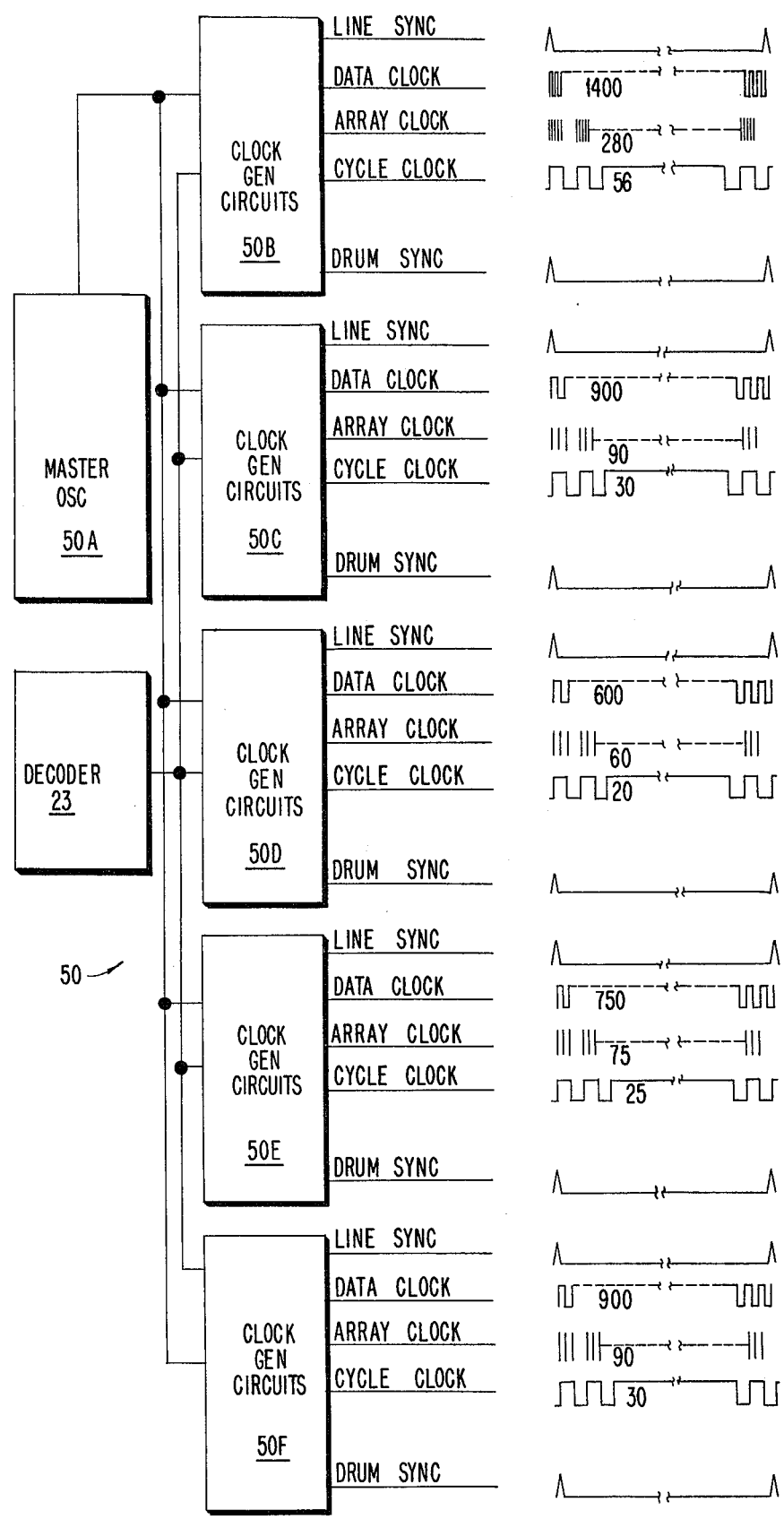
FIG. 10 is a schematic block diagram of the clock generator of FIG. 2 and includes graphical representations of the various elements from the clock generator for various resolutions at which printing is to occur.

The printer 10 includes circuitry similar to that shown and described in the aforesaid Fox et al application with modifications for the printer 10 to be operated at the various fax resolutions. Thus, the printer 10 includes a clock signal generator 50 (see FIG. 2), which applies the same signals as are supplied by the clock generator in the aforesaid Fox et al application. That is, the clock generator 50 supplies a line sync, a data clock, an array clock, and a cycle clock with all being controlled in response to a drum sync signal. However, the number of the data clock pulses, the array clock pulses, and the cycle clock pulses for each drum sync for a fax mode resolution is different that when printing is occurring at the standard resolution. The relationship of these clock signals is shown in FIG. 10.

The clock generator 50 includes a master oscillator 50A connected to clock generator circuits 50B, clock generator circuits 50C, clock generator circuits 50D, clock generator circuits 50E, and clock generator circuits 50F. Only one of the clock generator circuits 50B, 50C, 50D, 50E, and 50F is selected for a specific resolution at which the printer 10 is to print. This specific resolution is determined by the decoder 23, which has its output connected to each of the clock generator circuits 50B, 50C, 50D, 50E, and 50F.

The clock generator circuit 50B produces the various clock signals for the standard resolution while the clock generator circuits 50C, 50D, 50E, and 50F produce the clock pulses for various different fax mode resolutions. In the same manner as described in the aforesaid Fox et al application, it should be understood that each of the clock generator circuits 50B, 50C, 50D, 50E, and 50F will include counting circuits, logic circuits, differentiators, and integrators for operating on the pulses from the master oscillator 50A to provide the various types of outputs illustrated in FIG. 10.

Figure 6:
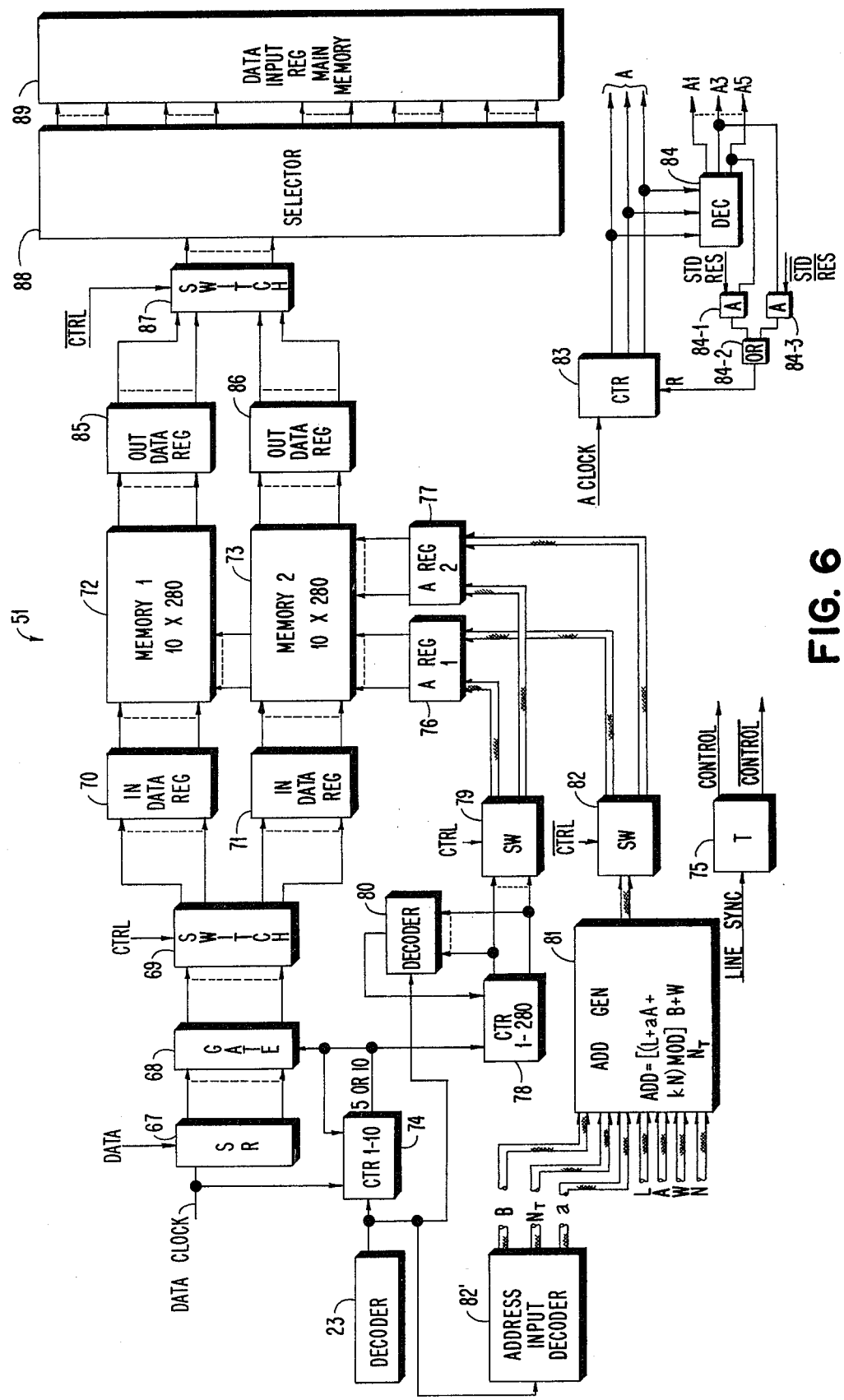
FIG. 6 is a block diagram of the source organizer of FIG. 2.

As shown in FIG. 2, the clock generator 50 supplies two clock signals, data clock and line sync, to the scanner 11 and all four of the clock signals to a source organizer 51, which is more particularly shown in FIG. 6. The source organizer 51 is connected through the switch 12 to receive data either from the scanner 11 or from the compress/decompress algorithm 14.

It should be understood that the compress/decompress algorithm 14 could be omitted but this would cause information to be transmitted at a slower rate. If the compress/decompress algorithm 14 is omitted, then the switch 12 could be connected directly to the communication buffer 19 during a document scan.

The source organizer 51 has two memory areas with each storing successive lines of data from the scanner 11 or the compress/decompress algorithm 14 in accordance with the position of the switch 12. When the data is being stored in one of the memory areas of the source organizer 51, the data in the other memory area of the source organizer 51 is being selectively supplied to a main memory 52.

The source organizer 51 receives all four clock signals provided by the clock generator 50. Thus, in addition to the data clock and line sync signals, which also are applied to the document scanner 11, the source organizer 51 receives a cycle clock signal and an array clock signal A from the clock generator 50. The number of the clock signals generated by the clock generator 50 are in accordance with the resolution, either standard or facsimile.

The source organizer 51 also receives three additional signals from a signal value generator 53. The three signals received by the source organizer 51 from the input signal value generator 53 are a line value L, a nozzle value N, and a word value W. The magnitudes of L, N, and W are different for the standard resolution and for each of the fax resolutions. Thus, the selected resolution determines the values of each of these three signals.

In addition to receiving signals indicating whether the printer 10 is to operate in its standard resolution or one of the fax mode resolutions, the signal value generator 53 also receives the line sync and data clock signals from the clock generator 50 in accordance with the selected resolution and a present value signal stored in a register 54. The content of the register 54 represents misalignment of the medium 31 with respect to the drum 30 on which and with respect to which the image is generated. If no misalignment is present, the value stored in the register 54 is zero.

The stored data in the source organizer 51 is supplied to storage locations in the main memory 52 in accordance with an address from an address generator 54. The address generator 55 supplies the address to an address register 56 in accordance with the algorithm main memory address = $[L_{MOD}(kN + dL)]B + dN + W$ where L is the scan line number, MOD means modulo, i.e., translating to the number base $(kN + dL)$, N is the nozzle number of the nozzle 32 within one of the arrays 33–37 or the nozzle number of the nozzle 39 within one of the fax arrays 40–42, k is the nozzle spacing within the nozzle array expressed in integer pels, dL is the number of the scan lines of data stored before the first nozzle begins to print and this is zero in this application, B is the number of memory words per segment, dN is the first address in the memory allocated to the nozzle number N with $dN = BN[K/2(N-1) + dL]$, and W is the word value (modulo B). It should be understood that $L_{MOD(kN + dL)}$ requires an independent counter (not shown) for each nozzle. The dN values can be stored in a read only memory within the address generator 55.

The address generator 55 supplies the address to the address register 56 in accordance with the magnitudes of the L, N, and W signals produced for the signal value generator 53 and the magnitudes of the signals B and k from an address input decoder 56'. The address input decoder 56' is controlled by signals from the decoder 23. Thus, the output of the address input decoder 56' depends upon the selected fax mode resolution or the standard resolution. By inserting the output of the address generator 55 in the address register 56, the address register 56 controls the location within the main memory 52 in which the data from the source organizer 51 is inserted.

The stored data in the main memory 52 is applied one word at a time by a switch 57 and an array 58 of registers to either the arrays 33—37 of the ink jet nozzles 32 or the fax arrays 40-42 of the ink jet nozzles 39. The switch 57 is under the control of the magnitude of the nozzle value N from the signal value generator 53 and the desired resolution to be printed. The desired resolution is supplied to an array/nozzle select control 59, which is part of the switch 57, from the decoder 23.

Accordingly, the stored signals in the main memory 52 control either the nozzles 32 (see FIG. 3) or the nozzles 39 depending upon whether the standard resolution or one of the fax resolutions is to be used. The stored signals control the deposition of ink through either the ink jet nozzles 32 or 39 on the medium 31. Since the array support 38 is driven axially by the motor 44 while the drum 30 is rotated by the motor 46 (see FIG. 5), each of the nozzles 32 or 39 produces a spiral about the medium 31 on the drum 30. As the nozzle 32 or 39 produces the spiral, ink is either applied at each segment from the particular nozzle or not depending on the input from the stored data in the main memory 52.

Figure 8:
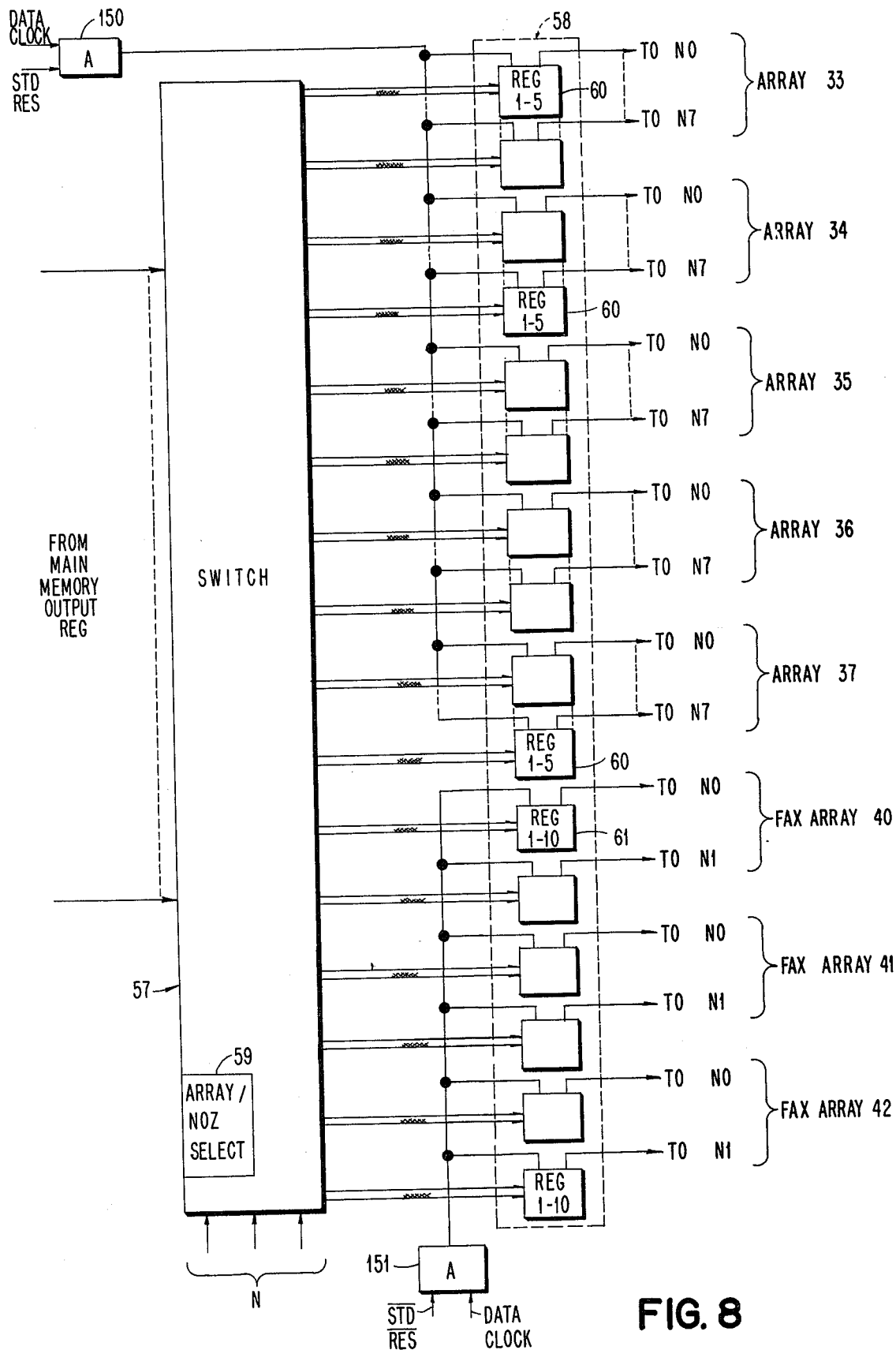
FIG. 8 is a block diagram of the array registers and their control switches.

As shown in FIG. 8, the array 58 of registers includes a plurality of registers 60 for use with the arrays 33-37 and a plurality of registers 61 for use with the fax arrays 40–42. Each of the arrays 33-37 has one of the registers 60 connected to each of the nozzles 32 while each of the fax arrays 40-42 has one of the registers 61 connected to each of the nozzles 39. The number of the registers 60, which are connected to each of the arrays 33-37, is the same as the number of the nozzles 32 in each of the arrays 33-37. Similarly, the number of the registers 61, which are connected to each of the fax arrays 40-42, is equal to the number of the nozzles 39 in each of the fax arrays 40-42. Since the example has eight of the nozzles 32 in each of the arrays 33-37 and two of the nozzles 39 in each of the fax arrays 40-42, there are eight of the registers 60 for each of the arrays 33-37 and two of the registers 61 for each of the fax arrays 40-42.

The clock generator 50 (see FIG. 2) supplies a read/write control signal to the main memory 52 to cause read and write cycles to continuously occur in the main memory 52. The read/write control signal from the clock generator 50 is the cycle clock with the number produced for each line sync being determined by the selected resolution. The read control signal occurs when the cycle clock is up, and the write control signal occurs when the cycle clock is down. It is necessary for the read cycle to occur first so that useful data is not destroyed by overwriting.

During each read cycle, each memory address, which is generated by the address generator 55, is read from the main memory 52 through the switch 57 to the arrays 33-37 or the fax arrays 40-42. Upon completion of the read cycle, new image information is stored in the main memory 52 during a write cycle in accordance with the address supplied from the address generator 55.

A drum sync signal is applied from a drum sync generator 62 to the clock generator 50, the compress/decompress algorithm 14 (see FIG. 1), and the file buffer 16. The supply of the drum sync signal to the clock generator 50 causes the line sync signal, which is produced by the clock generator 50, to be synchronized with the drum sync signal so that the data from the scanner 11 gto the printer 10 when the switch 12 connects the scanner 11 to the printer 10 cannot fall behind or get ahead of the printing. This prevents underruns and overruns of the data in the main memory 52 so as to produce the required amount of storage.

Similarly, the drum sync signal to the compress/decompress algorithm 14 and the file buffer 16 prevents underruns and overruns of data in the multi-page file 17 so as to reduce the required amount of storage. This is applicable when the switch 12 connects the printer 10 to the compress/decompress algorithm 14 at the time of printing and when the switch 12 connects the scanner 11 to the compress/decompress algorithm 14 at the time of scanning.

The drum sync generator 62 includes a first disc 63 (see FIG. 5) having scribed transparent lines therein arranged around the periphery of the disc 63. The number of the transparent lines is equal to the number of the nozzles 32 in the arrays 33-37. Thus, there would be a total of forty scribed transparent lines on the disc 63 in the example shown.

The drum sync generator 62 also includes a second disc 63A having scribed transparent lines therein arranged around the periphery of the disc 63A. The number of the transparent lines is equal to the total number of the nozzles 39 in the fax arrays 40-42. Thus, there would be a total of six scribed transparent lines on the disc 63A in the example shown.

The discs 63 and 63A are attached to the drum 31 for rotation therewith. The disc 63 rotates between a light source 64 and a detector 65, which produces the drum sync signal whenever the light source 64 is detected thereby. The disc 63A rotates between a light source 64A and a detector 65A, which produces the drum sync signal whenever the light source 64A is detected thereby.

The signals from the detectors 65 and 65A are controlled in accordance with whether the standard resolution or one of the fax mode resolutions is to be used. Furthermore, when only one of the nozzles 39 of each of the fax arrays 40-42 is being employed, then the signal from the decoder 23 is such that only every second drum sync signal from the detector 65A is supplied from the drum sync generator 62.

When using the forty nozzles 32 for printing the standard resolution (this is when the scanner 11 is connected to the printer 10 by the switch 12.), each of the scan lines has forty segments so that each segment corresponds to one of the nozzles 32 in the manner more particularly shown and described in the aforesaid Fox et al application. The number of the scan lines produced by the forty nozzles 32 during one complete interlacing pattern, which has one-half produced during one revolution of the drum 30 and the other half produced during the next revolution of the drum 30, is forty. Thus, during each revolution of the drum 30, one-half of one interlacing pattern is being produced while the other half of the next interlacing pattern of the next of the forty scan lines is being produced.

Figures 11, 12B:
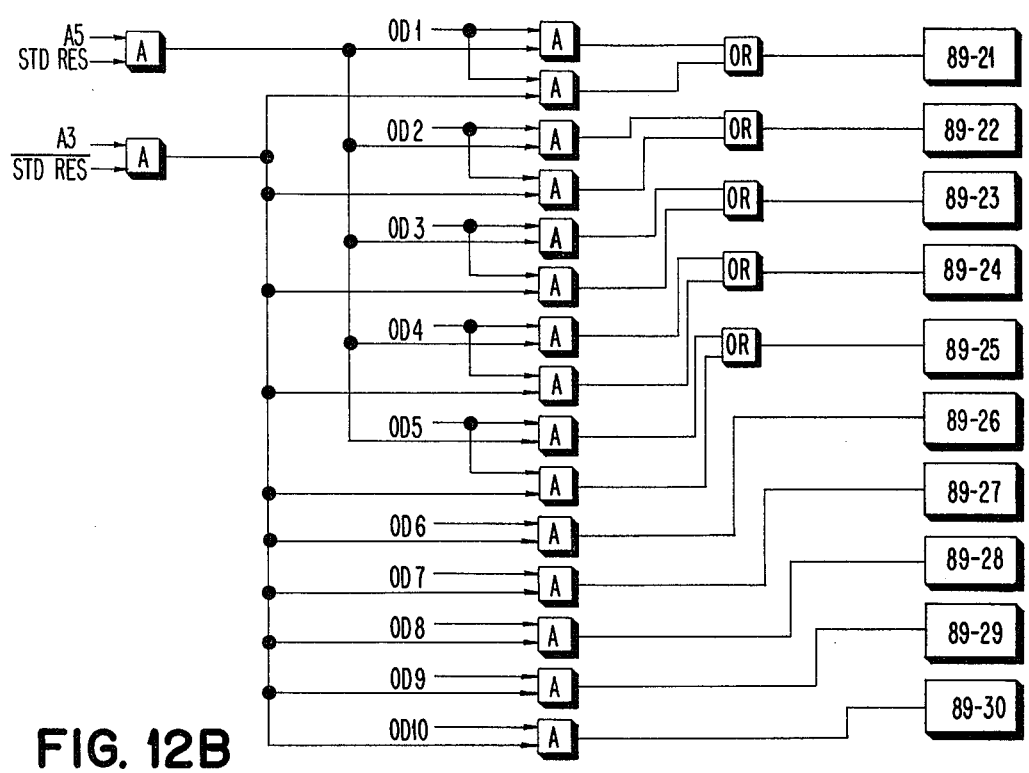
FIG. 11 is a schematic diagram illustrating the segments and lines printed for a facsimile mode resolution in which a single nozzle from each of three fax arrays is used.
FIGS. 12A and 12B are block diagrams of a selector of FIG. 6.

When using the two ink jet nozzles 39 of each of the three fax arrays 40-42, there are six segments in each of the scan lines since there are six nozzles. There are six of the scan lines produced during any revolution of the drum 30 with half of the segments being completed during one revolution of the drum 30 and the other half of the segments being produced during the next revolution of the drum 30. The interlacing pattern produced by the two nozzles 39 in each of the three fax arrays 40-42 is schematically shown in FIG. 11 by three digit numbers. The first two digits correspond to the fax array number while the third digit corresponds to the location of the nozzle 39 in the fax array with the two nozzles 39 being identified by 1 and 2 with the nozzle 39 most advanced in the direction of axial travel being 1.

The relation of the nozzle, the number of arrays, and other related information is set forth in Table I for standard resolution and for four different fax mode resolutions with FAX 1 having both of the nozzles 39 of each of the three arrays 39-42 employed and FAX 2, FAX 3, and FAX 4 being for different resolutions with only one of the nozzles 39 of each of the fax arrays 40-42.

TABLE I

| PARAMETER DESCRIPTION | STANDARD RESOLUTION | FAX 1 | FAX 2 | FAX 3 | FAX 4 |
|---|---|---|---|---|---|
| number of arrays, M | 5 | 3 | 3 | 3 | 3 |
| number of nozzles/array, $N_A$ | 8 | 2 | 1 | 1 | 1 |
| total nozzles (segments in a scan line), $N_T = N_A \times M$ | 40 | 6 | 3 | 3 | 3 |
| bits (pels)/scan line (number of data clock pulses/scan line), D | 1400 | 900 | 600 | 750 | 900 |
| bits/source organizer address, H | 5 | 10 | 10 | 10 | 10 |
| number of source organizer addresses/scan line (number of array clock/scan line), $S = \dfrac{D}{H}$ | 280 | 90 | 60 | 75 | 90 |
| memory words/scan line (number of cycle clocks/scan line), $C = \dfrac{S}{M}$ | 56 | 30 | 20 | 25 | 30 |
| bits/segment, $b = \dfrac{D}{N_T}$ | 35 | 150 | 200 | 250 | 300 |
| bits/nozzle/memory word (source organizer bits/ | | | | | |

TABLE I-continued

| PARAMETER DESCRIPTION | STANDARD RESOLUTION | FAX 1 | FAX 2 | FAX 3 | FAX 4 |
|---|---|---|---|---|---|
| word), G | 5 | 10 | 10 | 10 | 10 |
| memory words/segment, $B = \dfrac{b}{G}$ | 7 | 15 | 20 | 25 | 30 |
| nozzle spacing within an array in integer pels, k | 5 | 3 | 0 | 0 | 0 |
| segment spacing between arrays during printing, a | 1 | 2 | 1 | 1 | 1 |

As shown in FIG. 6, the source organizer 51 includes a shift register 67 having data signals supplied thereto from either the scanner 11 or from the compress/decompress algorithm 14 depending on the position of the switch 12. These signals are shifted in the shift register 67 under control of the data clock signals from the clock signal generator 50.

The shift register 67 stores ten bits and has ten parallel outputs, which are applied by a gate 68 and a switch 69 to one or the other of two input data registers 70 and 71. The input data registers 70 and 71 are associated with random access memories 72 and 73, respectively.

In addition to the data clock signals being supplied from the clock generator 50 to the shift register 67 to control the data signals shifted thereinto, the data clock signals also are applied to a 1-10 counter 74, which provides a signal to enable the gate 68 and reset the counter 74 at each count of five or ten depending on the resolution to be printed. During a standard resolution, the counter 74 counts to five and then produces a signal to enable the gate 68 and reset the counter 74. During any fax mode resolution, the counter 74 counts to ten before providing signal to enable the gate 68 and reset the counter 74.

The counter 74 receives an input from the decoder 23 to determine whether the counter 74 counts to five or ten before producing an output signal to enable the gate 68 and reset the counter 74. Thus, only the first five bits of the shift register 67 have meaningful data during the standard resolution while all ten bits of the shift register 67 contain useful information during any fax mode resolution. The enabling of the gate 68 applies the contents of the shift register 67 in parallel to the switch 69, which causes the contents of the shift register 67 to be applied to one of the input data registers 70 and 71.

The switch 69 has a control signal, which is generated by a trigger 75, applied thereto to determine which of the input data registers 70 and 71 receives the data from the shift register 67. The trigger 75 recieves an input of the line sync signal from one of the clock generator circuits 50B, 50C, 50D, 50E, and 50F (see FIG. 10) of the clock generator 50 in accordance with the resolution to be printed so that the trigger 75 (see FIG. 6) changes state with each line sync signal. Thus, during one scan line period, the contents of the shift register 67 are applied serially ten bits in parallel to the input data register 70. During the next scan line period, the contents of the shift register 67 are similarly applied to the input data register 71.

While all 10 bits of the shift register 67 are applied serially in parallel to one of the input data registers 70 and 71, it should be understood that only the first five bits contain useful information when the standard resolution is to be printed. When any fax mode resolution is to be printed, all ten bits of the shift register 67 contain meaningful information.

The data in the input data register 70 is stored at a location in the memory 72 in accordance with the address supplied from an address register 76. Similarly, the contents of the input data register 71 are stored in the memory 73 at a location defined by the address from an address register 77.

The actual address inserted in each of the registers 76 and 77 is generated by a counter 78, which can count from one to two hundred and eighty since two hundred and eighty is the maximum number of addresses required in either the memory 72 or the memory 73. The number to which the counter 78 counts depends upon the number of source organizer addresses required. While 280 is the number of source organizer addresses per scan line for the stantard resolution as indicated in Table I, the number of souce organizer addresses per scan line for the various fax resolutions varies from 60 to 90 as indicated in Table I.

Since each of the 280 addressable positions in each of the memories 72 and 73 contains 10 bits, each of the memories 72 and 73 accommodates 2800 bits in a single scan line. While each of the memories 72 and 73 accommodates ten bits for each of the 280 addressable positions, only five of the bits contain useful information when the maximum of 280 addressable positions is employed since this is for a standard resolution. The 10 bits contain useful information only in the fax mode resolutions since each of the source organizer addresses for the fax mode resolutions contains ten bits per address as indicated in Table I.

The output of the counter 78 is applied by a switch 79 to ether the address register 76 or the address register 77 depending upon the position of the switch 79. The position of the switch 79 is determined by the state of the control signal from the trigger 75 in the same manner as the switch 69.

Thus, when the control signal from the trigger 75 is in one state, the output of the counter 78 is inserted in the register 76, and this is when the data from the shift register 67 is being applied to the input data register 70 since the switches 69 and 79 provide these connections at the same time. When the state of the trigger 75 changes, then the switches 69 and 79 change so that the counter 78 is connected to the address register 77 at the same time that the data from the shift register 67 is being supplied to the input data register 71. Thus, the contents of the scanned lines are inserted alternately in the memories 72 and 73.

A decoder 80 also is connected to the output of the counter 78. The decoder 80 decodes the count of the counter 78 in accordance with the number of source organizer addresses per scan line and resets the counter 78 at the count of one to process the next scanned line. The decoder 80 is connected to the decoder 23 so that the decoder 80 decodes at the count of 280 and resets the counter 78 only for the standard resolution. For FAX 1 and FAX 4 resolutions, the decoder decodes at the count of ninety and resets the counter 78 to one. For FAX 2 resolution, the decoder 80 decodes at the count of sixty and resets the counter 78 to one while the decoder 80 decodes at the count of seventy-five and resets the counter 78 to one for FAX 3 resolution.

When the counter 78 is connected by the switch 79 to one of the registers 76 and 77 to supply addresses to the memory 72 or 73 to which the address registers 76 and 77 are respectively connected, the other of the address registers 76 and 77 is connected to an address generator 81 through a switch 82. The switch 82 is under the control of the state of the trigger 75 but is receiving the opposite signal to that supplied to the switches 69 and 79. That is, the control output from the trigger 75 is supplied to the switch 82 at the time that the control output from the trigger 75 is supplied to the switches 69 and 79. This is indicated in FIG. 6 by the control signal being shown as the input to the switch 82. It should be understood that the control output from the trigger 75 is supplied to the switch 82 at the time that the control is supplied to the switches 69 and 79.

Thus, at the time that one of the address registers 76 and 77 is connected to the counter 78, the other of the address registers 76 and 77 is being supplied an address from the address generator 81. This is used to address the memory 72 or 73, which is not having data stored therein at that time, to cause the data in the memory 72 or 73 to be read at the time that data is being written into the other of the memories 72 and 73.

The address generator 81 generates an address in accordance with the algorithm $$\text{address} = \left[ (L + aA + kN) \underset{N_T}{\text{MOD}} \right] B + N$$

where L is the scan line number, a is the spacing between the arrays during printing in integer segments, A is the array number, k is the nozzle spacing within an array expressed in integer pels, N is the nozzle number within an array, MOD means modulo, i.e., translating the number base $N_T$, and $N_T$, B, and W have been previously defined.

Accordingly, the address generator 81 receives L, N, and W outputs from the signal value generator 53, B, $N_T$, and a outputs from an address input decoder 82', and an output A from a counter 83. The address input decoder 82' supplies its outputs in accordance with the resolution at which the printer 10 is to operate. The address input decoder 82' receives its input from the decoder 23 to determine its outputs.

The counter 83 has the array clock signals from the clock generator 50 applied thereto. Each of the outputs from the counter 83 is identified as A, and this is the signal supplied to the address generator 81.

The outputs A from the counter 83 also are applied to a decoder 84, which provides outputs A-1 through A-5. The A-5 output from the decoder 84 is supplied to an AND gate 84-1, which has STD RES from the decoder 23 as its other input. The STD RES input is from the decoder 23 whenever the standard resolution is to be printed.

The output of the AND gate 84-1 is supplied through an OR gate 84-2 to reset input R of the counter 83. Thus, during a standard resolution in which the five arrays 33-37 always are used, the A-5 output of the decoder 84 is supplied to the reset input R of the counter 83 to reset the counter 83 to zero count to begin counting again.

The output A-3 is supplied to an AND gate 84-3, which has STD RES as its other input. The STD RES input is from the decoder 23 whenever one of the fax mode resolutions is to be printed. The output of the AND gate 84-3 is connected as an input to the OR gate 84-2. Thus, when any of the fax mode resolutions are to be printed with all three of the fax arrays 40-42 being used as indicated in Table I, the output A-3 resets the counter 83 to the count of zero to begin counting again.

The counter 83 is reset during each one-half of the cycle clock as shown in FIG. 10. That is, each of the array clocks, which are supplied to the counter 83, contains five pulses in each half of a cycle clock period when the standard resolution is being printed and three pulses in each half of the cycle clock period when any of the fax mode resolutions is being printed.

When the memory 72 (see FIG. 6) is receiving an address from the address generator 81, the stored data in the memory 72 is transferred to an output data register 85. During the next scan line, the data, which was stored in the memory 73 while the data in the memory 72 was being transferred to the output data register 85, is transferred to an output data register 86. Thus, the contents of each of the memories 72 and 73 are stored during one scan line and removed during the following scan line.

The output data registers 85 and 86 are connected through a switch 87 and a selector 88 to a data input register 89, which is associated with the main memory 52. The switch 87 is responsive to the same state of the trigger 75 as the switch 82. Thus, when the switch 82 connects the address generator 81 with the address register 77 to transfer the data in the memory 73 into the output data register 86, the switch 87 connects the output data register 86 with the selector 88. When the switch 82 is in the position in which the memory 72 is transferring the data therein to the output data register 85, the switch 87 connects the output data register 85 to the selector 88.

Thus, during each clock cycle, the selector 88 is connected to one of the output data registers 85 and 86. The selector 88 controls where each bit from each of the output data registers 85 and 86 is stored in the data input register 89. Thus, the selector 88 enables all ten of the bits from the output data register 85 or 86 to be stored in the data input register 89 during a fax mode resolution while enabling only the first five bits of each 10 bits from the output data register 85 or 86 to be stored in the data input register 89 during a standard resolution.

Figure 12A:
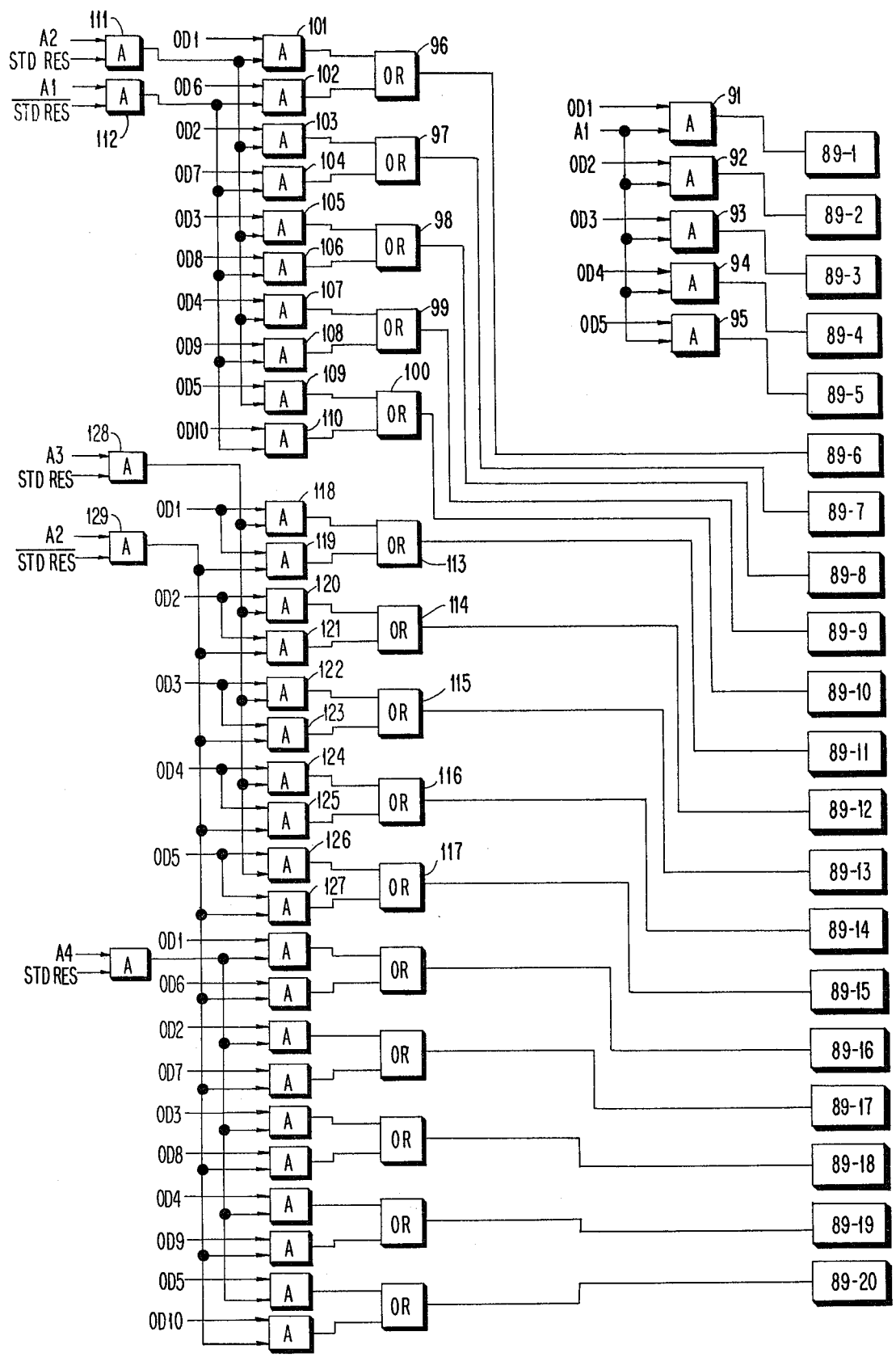

As shown in FIGS. 12A and 12B, the data input register 89 has thirty storage locations 89-1 through 89-30 for the thirty bits for a scan line during a fax mode resolution. Only the first twenty-five (89-1 through 89-25) of these thirty storage locations 89-1 through 89-30 are used during a standard resolution.

During any transmission of data from the output data register 85 or 86, there are ten bits of data. These are identified as OD1 through OD10 in FIGS. 12A and 12B.

AND gates 91, 92, 93, 94, and 95 have their outputs connected to storage locations 89-1, 89-2, 89-3, 89-4, and 89-5, respectively, in the data input register 89. Each of the AND gates 91-95 has the output A-1 from the decoder 84 as one of its inputs. The AND gates 91, 92, 93, 94, and 95 have the outputs OD1, OD2, OD3, OD4, and OD5, respectively, from the output data register 85 or 86 as their other input.

Accordingly, the outputs OD1 through OD5 from the output data register 85 or 86 are supplied to the storage locations 89-1 through 89-5, respectively, in the data input register 89 only when the output A-1 from the decoder 84 is produced. Thus, the first five bits, irrespective of whether the printer 10 is operating in a standard resolution or a fax mode resolution, are supplied to the storage locations 89-1 through 89-5 of the data input register 89.

In the standard resolution, five data bits from five addresses of the memory 72 or 73 comprise a twenty-five bit word for the main memory 52. In the fax mode resolution, ten data bits from three addresses of the memory 72 or 73 comprise a thirty bit word for the main memory 52.

The data input register 89 has its storage locations 89-6, 89-7, 89-8, 89-9, and 89-10 connected to OR gates 96, 97, 98, 99, and 100, respectively. The OR gate 96 has its inputs connected to the outputs of AND gates 101 and 102. The OR gate 97 has the outputs of AND gates 103 and 104 as its inputs. The OR gate 98 has inputs connected to the outputs of AND gates 105 and 106. The OR gate 99 has the outputs of AND gates 107 and 108 as its inputs. The OR gate 100 has its inputs connected to the outputs of AND gates 109 and 110.

The AND gate 101 has the output of an AND gate 111 as one of its inputs while the output OD1 is its other input. The AND gate 111 has the output A-2 of the decoder 84 as one of its inputs while STD RES output from the decoder 23 is the other input to the AND gate 111. Thus, the AND gate 111 produces a high only when the printer 10 is operating in the standard resolution and the decoder 84 is producing the output A-2. The decoder 84 produces the output A-2 when the second address of the twenty-five bit word of the standard resolution is being processed.

The AND gate 102 has the output OD6 as one of its inputs while the output of an AND gate 112 is its other input. The AND gate 112 has the output A-1 from the decoder 84 as one of its inputs with STD RES from the decoder 23 as its other input. Thus, the AND gate 112 produces a high only when the printer 10 is operating in one of the fax mode resolutions and the decoder 84 is producing the output A-1. The decoder 84 produces the output A-1 when the first address of the thirty bit word of the fax mode resolution is being processed.

Accordingly, during a standard resolution, the output of the AND gate 111 is high so that the AND gate 101 passes the output OD1 to the OR gate 96 for supply to the sixth storage location 98-6. Thus, during the standard resolution, the sixth bit, which is stored in the storage location 89-6 of the data input register 89, is the first bit of the second address from the memory 72 or 73 of the 25 bit word. During the standard resolution, the sixth bit from the first address from the memory 72 or 73 of the 25 bit word cannot pass through the AND gate 102 because the output of the AND gate 112 is not high. This is because the input STD RES is low to the AND gate 112 during a standard resolution.

During a fax mode resolution, the sixth bit (the output OD6) from the first address from the memory 72 or 73 of the thirty bit word is passed through the AND gate 102 and the OR gate 96 to the storage location 89-6 of the data input register 89. This is because the output of the AND gate 112 is high since STD RES is high and the output A-1 of the decoder 84 is high.

Similarly, the AND gate 103 will pass the output OD2 to the storage location 89-7 in the data input register 89 from the second address from the memory 72 or 73 of the 25 bit word when a standard resolution is being printed. When a fax mode resolution is being printed, the AND gate 104 will pass the output OD7 from the first address from the memory 72 or 73 of the 30 bit word through the OR gate 97 to the storage location 89-7 in the data input register 89. This is because the output of the AND gate 112 is high during a fax mode resolution.

Accordingly, the storage locations 89-6, 89-7, 89-8, 89-9, and 89-10 in the data input register 89 receive the sixth to 10th bits of the first address of the 30 bit word from the memory 72 or 73 when the printer 10 is operating in a fax mode resolution. During a standard resolution, the sixth to tenth bits of the first address of the twenty-five bit word are not supplied to the storage locations 89-6 through 89-10 in the data input register 89. Instead, the first to fifth bits of the second address of the twenty-five bit word are stored in the storage locations 89-6 through 89-10 of the data input register 89.

Storage locations 89-11, 89-12, 89-13, 89-14, and 89-15 of the data input register 89 are connected to OR gates 113, 114, 115, 116, and 117, respectively. The OR gate 113 has the outputs of AND gates 118 and 119 as its inputs. The OR gate 114 has its inputs connected to the outputs of AND gates 120 and 121. The OR gate 115 has the outputs of AND gates 122 and 123 as its inputs. The OR gate 116 has its inputs connected to the outputs of AND gates 124 and 125. The OR gate 117 has the outputs of AND gates 126 and 127 as its inputs.

Each of the AND gate 118 and the AND gate 119 has the output OD1 as one of its inputs. The AND gate 118 has the output of an AND gate 128 as its other input while the AND gate 119 has the output of an AND gate 129 as its other output.

The AND gate 128 has the output A-3 of the decoder 84 as one of its inputs while STD RES is its other input. Thus, the output of the AND gate 128 is high when the printer 10 is printing at the standard resolution and the output A-3 of the decoder 84 is high. Therefore, the AND gate 118 passes the first bit (the output OD1) of the third address of the twenty-five bit word from the memory 72 or 73 during a standard resolution for storage in the storage location 89-11 in the data input register 89. This is the eleventh usable bit in the standard resolution since only the first five bits of each of the addresses is used.

The AND gate 129 has the output A-2 of the decoder 84 as one of its inputs. The other input to the AND gate 129 is STD RES from the decoder 23. Thus, the AND gate 129 has a high output during any fax mode resolution when the second address of the 30 bit word from the memory 72 or 73 is being supplied to the selector 88. Therefore, when the AND gate 129 has a high output, the AND gate 119 passes the output OD1 to the storage location 89-11 in the data input register 89. The output OD1 is the first bit from the second address of the thirty bit word in the memory 72 or 73 during a fax mode resolution. Accordingly, the storage locations 89-11 through 89-15 of the data input register 89 store the first five bits of the third address of the 25 bit word from the memory 72 or 73 during a standard resolution and the first five bits of the second address of the thirty bit word from the memory 72 or 73 during a fax mode resolution.

Storage locations 89-16 through 89-29 of the data input register 89 store the second five bits (the outputs OD6 through OD10) of the second address of the thirty bit word from the memory 72 or 73 during a fax mode resolution and the first five bits (the outputs OD1 through OD5) of the fourth address of the twenty-five bit word from the memory 72 or 73 during the standard resolution. Storage locations 89-21 through 89-25 of the data input register 89 store the first five bits (the outputs OD1 through OD5) of the fifth address of the 25 bit word from the memory 72 or 73 during a standard resolution while storing the first five bits (the outputs OD1 through OD5) of the third address of the 30 bit word from the memory 72 or 73 during a fax mode resolution.

Storage locations 89-26 through 89-30 of the data input register 89 do not store any signals during a standard resolution because the word is only 25 bits long during a standard resolution. However, the storage locations 89-26 through 89-30 of the data input register 89 store the sixth through tenth bits (the outputs OD6 through OD10) of the third address of the thirty bit word from the memory 72 or 73 during a fax mode resolution. This is because words in the fax mode resolution have a length of 30 bits rather than 25.

Thus, it is necessary to process five addresses from the memory 72 or 73 during one clock cycle in a standard resolution because the word length in the main memory 52 is twenty-five bits while each of the memories 72 and 73 has a work length of only five bits insofar as meaningful data is concerned. Thus, the contents of five addresses from the memory 72 or 73 are assembled in the input data register 89 during each clock cycle of a standard resolution for later insertion into the main memory 52.

It is necessary to process only three addresses from the memory 72 or 73 during one clock cycle of a fax mode resolution. Although the word length in the main memory 52 is thirty bits during a fax mode resolution, each of the memories 72 and 73 has an effective word length of ten bits rather than five. Thus, the contents of three addresses in the memory 72 or 73 are assembled in the data input register 89 during each clock cycle of the fax mode resolution for later insertion into the main memory 52.

Figure 7:
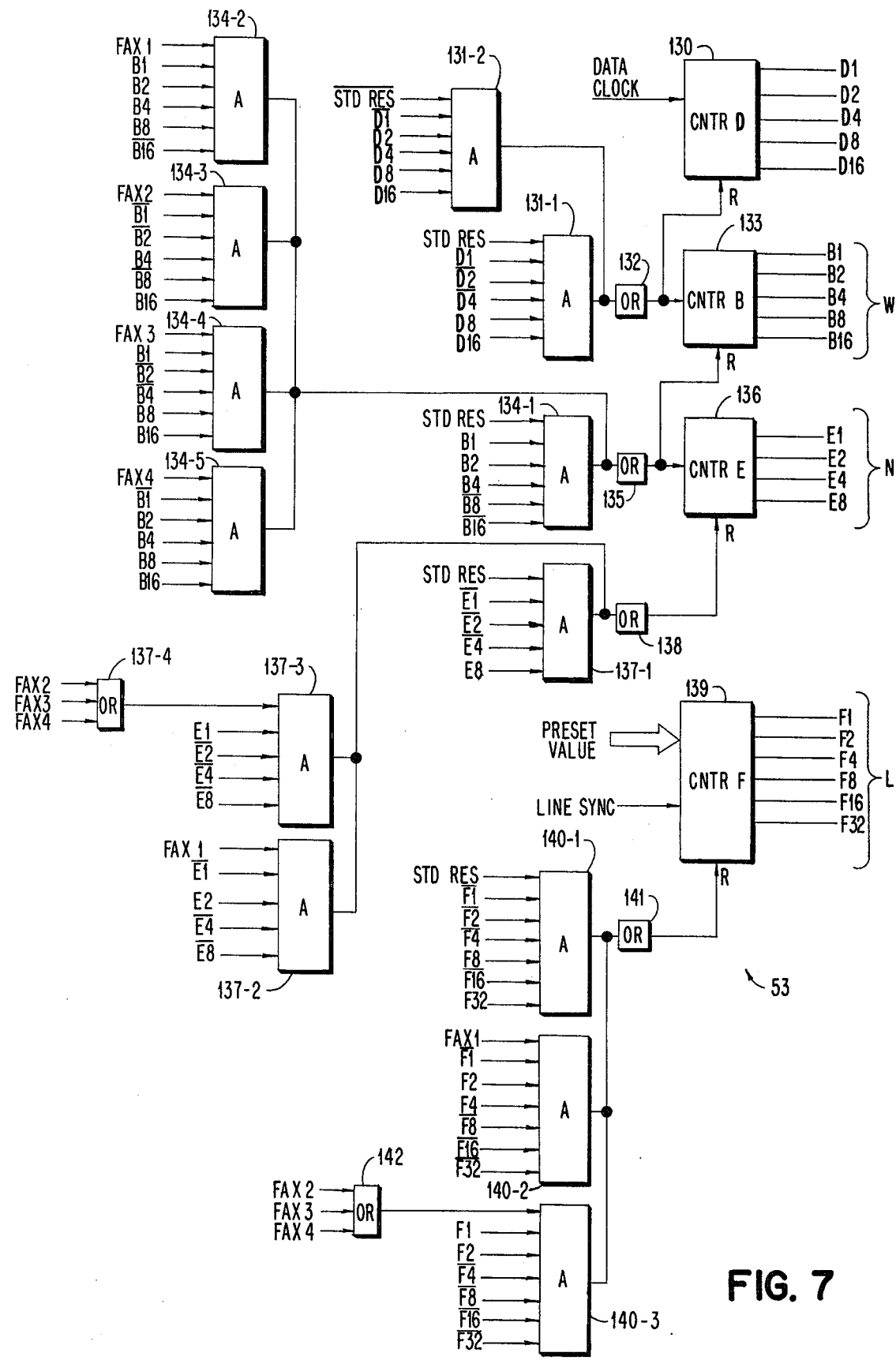
FIG. 7 is a block diagram of the signal value generator of FIG. 2.

As previously mentioned, the signal value generator 53 produces the magnitudes of L, N, and W in accordance with the resolution to be printed. As shown in FIG. 7, the signal value generator 53 includes a D counter 130, which receives the data clock signals from the clock generator 50. The counter 130 has five counting stages having paired complementary outputs D1, D2, D4, D8, and D16 so that it can count to 32.

An AND gate 131-1 has outputs D1, D2, D4, D8, and D16 of the counter 130 applied thereto as inputs. The AND gate 131-1 also has a STD RES input supplied thereto from the decoder 23 when the switch 12 connected the scanner 11 to the printer 10 to produce the standard resolution.

An AND gate 131-2 has outputs D1, D2, D4, D8, and D16 of the counter 130 applied thereto as inputs. The AND gate 131-2 also has a STD RES input supplied thereto from the decoder 23 when the printer 10 is connected by the switch 12 to the compress/decompress algorithm 14 so that a fax mode resolution is to be produced.

Each of the AND gates 131-1 and 131-2 is connected through an OR gate 132 to reset input R of the counter 130. Thus, during a standard resolution, the counter 130 is reset after counting to 25 data clock pulses since the AND gate 131-1 produces an output at this time to reset the counter 130 to zero. These 25 data clock pulses correspond to the number of the bits in a word in the main memory 52 when a standard resolution is to be printed.

The counter 130 is reset after counting to thirty data clock pulses when the AND gate 131-2 produces an output. These 30 data clock pulses correspond to the number of the bits in a word in the main memory 52 when any of the fax mode resolutions is being printed as shown in Table I. If any fax mode resolution should be desired in which the number of bits in a word in the main memory 52 is other than 25 or 30, the OR gate 132 would have to have another AND gate as an input. It might even be necessary to increase the number to which the counter 130 can count before being reset depending on the number of bits in a word in the main memory 52.

The OR gate 132 also is connected to a B counter 133 to cause it to count one each time that the OR gate 132 supplies an output. The B counter 133 has five counting stages having paired complementary outputs B1, B2, B4, B8, and B16 so that it can count to 32. The output of the B counter 133 provides a word count W.

An AND gate 134-1 has outputs B1, B2, B4, B8, and B16 of the counter 133 applied thereto as inputs. The AND gate 134-1 also has a STD RES input supplied thereto when the decoder 23 supplies an output to indicate that a standard resolution, which has the switch 12 connecting the scanner 11 to the printer 10, is to be printed. Thus, the AND gate 134-1 produces an output at the count of seven from the counter 133.

An AND gate 134-2 has outputs B1, B2, B4, B8, and B16 of the counter 133 applied thereto as inputs. The AND gate 134-2 also has a FAX 1 input supplied thereto when the decoder 23 supplies an output to indicate that the FAX 1 mode resolution is to be printed. Thus, the AND gate 134-2 produces an output at the count of 15 from the counter 133.

An AND gate 134-3 has outputs B1, B2, B4, B8, and B16 of the counter 133 applied thereto as inputs. The AND gate 134-3 also has a FAX 2 input supplied thereto when the output of the decoder 23 indicates that FAX 2 mode resolution is to be printed. Thus, the AND gate 134-3 produces an output at the count of 20 from the counter 133.

An AND gate 134-4 has outputs B1, B2, B4, B8, and B16 of the counter 133 applied thereto as inputs. The AND gate 134-4 also has a FAX 3 input supplied thereto when the decoder 23 supplies an output to indicate that FAX 3 mode resolution is to be printed. Thus, the AND gate 134-4 produces an output at the count of 25 from the counter 133.

An AND gate 134-5 has outputs B1, B2, B4, B8, and B16 of the counter 133 applied thereto as inputs. The AND gate 134-5 also has a FAX 4 input supplied thereto when the output of the decoder 23 indicates that FAX 4 mode resolution is to be printed. Thus, the AND gate 134-5 produces an output at the count of 30 from the counter 133.

Each of the AND gates 134-1 to 134-5 has its output connected as an input to an OR gate 135. The output of the OR gate 135 is connected to reset input R of the B counter 133. Thus, the counter 133 is reset after counting to seven when the AND gate 134-1 produces an output; this is during the standard resolution. The counter 133 is reset after counting to fifteen when the AND gate 134-2 produces an output; this is during the FAX 1 mode resolution. The counter 133 is reset after counting to 20 when the AND gate 134-3 produces an output; this is during the FAX 2 mode resolution. The counter 133 is reset after counting to 25 when the AND gate 134-4 produces an output; this is during the FAX 3 mode resolution. The counter 133 is reset after counting to thirty when the AND gate 134-5 produces an output; this is during the FAX 4 mode resolution.

The output of the OR gate 135 also is connected to an E counter 136. The counter 136 has four counting stages having paired complementary outputs E1, E2, E4, and E8. These constitute the nozzle value N for each of the arrays. Thus, when the arrays 33–37 are used, it is desired that the counter 136 be reset at the count of eight since this is the number of nozzles 32 in each of the arrays 33–37. When the fax arrays 40-42 are used and both of the nozzles 39 of each of the arrays 40-42 are utilized, then the counter 136 is reset at the count of two for one specific fax resolution. When only one of the nozzles 39 of each of the fax arrays 40-42 is used, the counter 136 is reset at the count of one for any of the other fax modes.

Accordingly, AND gates 137-1, 137-2, and 137-3 are connected through an OR gate 138 to reset input R of the counter 136. The AND gate 137-1 has the outputs E1, E2, E4, and E8 of the counter 136 as inputs along with a STD RES input from the decoder 23. Thus, the AND gate 137-1 supplies a signal to reset the counter 136 at the count of eight only when the printer 10 is directly connected to the scanner 11 through the switch 12 since this causes the STD RES signal to be up.

The AND gate 137-2 has outputs E1, E2, E4, and E8 of the counter 136 connected thereto as inputs along with FAX 1 from the decoder 23. This occurs when both of the nozzles 39 of each of the arrays 40-42 are utilzied for one specific resolution. The AND gate 137-2 resets the counter 136 after it has counted to two.

The AND gate 137-3 has the outputs E1, E2, E4, and E8 of the counter 136 and an output of an OR gate 137-4 as its inputs. The OR gate 137-4 has FAX 2, FAX 3, and FAX 4 as its inputs. Thus, this is for any of the fax modes produced when using only one of the nozzles 39 of each of the arrays 40-42. The AND gate 137-3 resets the counter 136 after it counts to one.

A counter 139 has six output stages with outputs F1, F2, F4, F16, and F32 providing the line count L. The counter 139 is preset by the preset value stored in the register 54 (see FIG. 2). The line sync signals from one of the clock generator circuits 50B, 50C, 50D, 50E, and 50F (see FIG. 10) of the clock generator 50 are supplied to the step input of the counter 139 (see FIG. 7) to increase the count in the counter 139 by one at the start of each scan line.

The counter F counts the number of lines to be scanned and then is reset by the output from one of AND gates 140-1, 140-2, and 140-3 being supplied through an OR gate 141 to reset input R of the counter 139. The AND gate 140-1 has outputs F1, F2, F4, F8, F16, and F32 of the counter 139 applied as inputs along with a STD RES input from the decoder 23 when the printer 10 is connected to the scanner 11 through the switch 12. Thus, when the counter 139 counts forty lines, which is utilized in the standard resolution when employing forty of the nozzles 32, the counter 139 provides an output of forty as the maximum value of L.

The AND gate 140-2 has outputs F1, F2, F4, F8, F16, and F32 of the counter 139 as inputs along with FAX 1. Thus, the counter 139 is reset when it counts to six in the FAX 1 mode. This is for the resolution in which both nozzles of each of the fax arrays 40–42 are employed since six scan lines are produced during the spiral movement of the two nozzles 39 of each of the fax arrays 40–42 about the drum 30.

The AND gate 140-3 has outputs F1, F2, F4, F8, F16, and F32 of the counter 139 and an output of an OR gate 142 as inputs. The OR gate 142 has FAX 2, FAX 3, and FAX 4 as its inputs. Thus, the counter 139 is reset when it counts to three as there are only three scan lines formed by one of the nozzles 39 of each of the three arrays 40–42.

The switch 57 (see FIG. 8) is connected to an output register associated with the main memory 52 and receives 25 bits in parallel therefrom when the standard resolution is to be printed and thirty bits in parallel when one of the fax mode resolutions is to be printed. The switch 57 also receives the N signal from the counter 136 (see FIG. 7) of the signal value generator 53.

Furthermore, the array/nozzle select 59 of the switch 57 receives an input from the decoder 23 to indicate whether the printer 10 is operating at the standard resolution or one of the fax mode resolutions. Thus, the array/nozzle select 59 determines whether the nozzles 32 or the nozzles 39 are employed. If the nozzles 39 are employed, the array/nozzle select 59 also determines how many of the nozzles 39 of each of the fax arrays 40–42 are used.

The eight nozzles 32 of each of the arrays 33–37 are identified as nozzles N0 through N7 in FIG. 8. Each of the nozzles N0 through N7 of each of the arrays 33–37 has one of the registers 60 associated therewith so that there are a total of 40 of the registers 60.

The eight registers 60, which are associated with the first array 33, are connected in parallel to the first five bit positions (These correspond to the storage locations 89-1 through 89-5 as shown in FIG. 12A.) from the output register of the main memory 52 by the switch 57. The registers 60 are selectively connected under control of the magnitude of the N signal from the counter 136 (see FIG. 7) of the signal value generator 53.

The eight registers 60, which are associated with the array 34, are connected to the sixth through tenth bit positions of the output register of the main memory 52 by the switch 57. The registers 60 are selectively connected under control of the magnitude of the N signal from the counter 136 of the signal value generator 53.

Similarly, the eight registers 60, which are associated with each of the third array 35, the fourth array 36, and the fifth array 37, are connected to the next succeeding groups of five bits from the output register of the main memory 52 via the switch 57 under control of the magnitude of the N signal from the counter 136 of the signal value generator 53. The registers 60 are loaded in parallel by the switch 57, and the data contained in the registers 60 is shifted out in serial fashion under control of the data clock signal as shown in FIG. 8.

The data clock signal can be supplied from the clock generator 50 to the register 60 only when an AND gate 150 has a STD RES output from the decoder 23 due to the printer 10 being in the standard resolution. Thus, the data clock passes through the AND gate 150 to the registers 60 only during a standard resolution.

Each of the fax arrays 40–42 has the two nozzles 39 identified as No and N1. Each of the nozzles No and N1 of each of the fax arrays 40–42 has one of the registers 61 associated therewith so that there are a total of six of the registers 61.

The two registers 61, which are associated with the first fax array 40, are connected in parallel to the first ten bit positions (These correspond to the storage locations 89-1 through 89-10 as shown in FIG. 12A.) from the output register of the main memory 52 by the switch 57. They are selectively connected under control of the N signal from the counter 136 of the signal value generator 53 and the array/nozzle select 59.

The two registers 61, which are associated with the fax array 41, are connected to the eleventh through twentieth bits of the output register of the main memory 52 via the switch 57 under control of the N signal from the counter 136 of the signal value generator 53 and output of the array/nozzle select 59.

The two registers 61, which are associated with the third fax array 42, are connected to the next succeeding group of ten bits from the output register of the main memory 52 via the switch 57 under control of the N signal from the counter 136 of the signal value generator 53 and the output of the arran/nozzle select 59.

The registers 61 are loaded in parallel via the switch 57 and the data contained therein is shifted out in serial fashion under control of the data clock signals from the clock generator 50 to the connected nozzles as indicated in FIG. 8. The data clock signals from the clock generator 50 are supplied to the register 61 through and AND gate 151 only during a fax mode resolution. The AND gate 151 has STD RES from the decoder 23 as one of its inputs with the data clock being the other. Thus, the registers 61 supply an output only during a fax mode resolution.

Considering the operation of the present invention, the switch 12 is connected to the printer 10 of the scanner 11 by the microprocessor control 15 (see FIG. 1) when the printer 10 is to print at the standard resolution. At this time, the scanner 11 is set by the user or the microprocessor control 15 to scan at the standard resolution.

When it is desired to scan at one of the fax modes, the scanner 11 is set at this fax mode resolution, and the microprocessor control 15 moves the switch 12 to connect the scanner 11 to the compress/decompress algorithm 14. Then, the information from the scanner 11 is compressed by the compress/decompress algorithm 14 and supplied over the data bus 15' to the file buffer 16 from which it is stored in the multi-page file 17.

After the scanner 11 has completed scanning, the microprocessor control 15 causes the information stored in the multi-page file 17 to be supplied through the file buffer 16, a portion of the data bus 15', and the data bus 18 to the communication buffer 19, which regulates the flow of data to the communication adapter 20 and the modem 21 for supply over a telephone line, for example, to another of the printers 10, which is remote from the scanner 11 performing the document scanning.

From the telephone line, the data flows to the modem 21 of the printer 10, which is remote from the scanner 11. The data is transmitted from the modem 21 to the communication adapter 20.

The data is then transmitted from the communication adapter 20 through the communication buffer 19, the data bus 18, a portion of the data bus 15', and the file buffer 16 to the multi-page file 17 where it is stored. Thereafter, the microprocessor control 15 causes the stored data in the multi-page file 17 to be supplied through the file buffer 16, the compress/decompress algorithm 14, and the switch 12, which connects the compress/decompress algorithm 14 only to the printer 10 at this time, to the printer 10. When this data is supplied from the multi-page file 17 to the printer 10, the fax mode data is recognized by the decoder 23 and signals are supplied to the various controls of the printer 10 for the specific fax mode resolution. Printing then occurs at the desired fax mode resolution.

While the decoder 23 has been shown as receiving the fax mode data from the multi-page file 17, it should be understood that it could receive this information from the communication adapter 20 if the multi-page file 17 and the file buffer 16 are omitted. Thus, the decoder 23 would be connected directly to the controls of the printer 10 as indicated in phantom in FIG. 1 for the decoder 23.

While the present invention has shown and described a specific number of the arrays 33-37 being utilized to produce the standard resolution for the specific number of the nozzles 32, it should be understood that any number of the arrays 33-37 can be employed with each of the arrays 33-37 having the same number of the nozzles 32 and this number of the nozzles 32 being variable as desired.

While the present invention has shown and described the three fax arrays 40-42, it should be understood that the present invention may be utilized with only just one fax array, two fax arrays, or more than three fax arrays. Likewise, the number of the nozzles 39 may be varied as desired.

While the present invention has shown and described the fax arrays 40-42 as being separate from the arrays 33-37, it should be understood that the present invention could be utilized where only the arrays 33-37 were employed if they were symmetrically disposed about the circumference of the drum 30. However, this would not produce relatively large droplets, which are desired, in the facsimile resolution since the diameters of the nozzles 32 would not change.

If the arrays 33-37 were not symmetrically disposed about the circumference of the drum 30, then only one of the nozzles 32 of the arrays 33-37 could be used to produce a facsimile resolution. Thus, to use more than one of the nozzles 32 or more than one of the arrays 33-37 for facsimile resolution, the arrays 33-37 would have to be symmetrically disposed about the circumference of the drum 30. Therefore, if only two of the arrays 33-37 were utilized and these were disposed 180° from each other, then all of the nozzles 32 of each of these two arrays could be employed to produce one facsimile resolution and one of the nozzles of each of these two arrays could be utilized to produce any other facsimile resolution.

An advantage of this invention is that a plurality of different resolutions can be produced at a relatively low cost. Another advantage of this invention is that the ink jet printer can be utilized as both a copier and for producing facsimile resolutions.

While the invention has been particularly shown and described with reference to a preferred embodiment thereof, it will be understood by those skilled in the art that various changes in form and details may be made therein without departing from the spirit and scope of the invention.

What is claimed is:

1. An ink jet printer for selectively printing different resolutions on a medium comprising:

cylindrical means for supporting the medium for receiving ink drops;

a plurality of arrays of ink jet nozzles disposed relative to said cylindrical means, each of said arrays having a plurality of ink jet nozzles linearly spaced in a first direction to supply ink drops at a selected drop rate to the medium, said arrays being disposed relative to each other so that the tracks from each of said nozzles interlace with other tracks from other of said nozzles;

first producing means to produce relative linear motion between said cylindrical means and said arrays in the first direction;

second producing means to produce relative rotation between said cylindrical means and said arrays in a second direction substantially orthogonal to the first direction;

means to select at least one of said nozzles in at least one of said arrays in accordance with the resolution to be printed;

and means to alter at least two out of the velocity of said first producing means, the velocity of said second producing means, and the drop rate of the drops supplied in accordance with the desired resolution to be printed.

2. The printer according to claim 1 in which:

said selecting means selects all of said nozzles in each of said arrays for printing one of the desired resolutions and only one of said nozzles in each of said arrays for printing other resolutions;

and means to control said selecting means in accordance with the resolution to be printed.

3. The printer according to claim 1 in which:

said first producing means moves said arrays in the first direction to produce relative linear motion between said cylindrical means and said arrays in the first direction;

and said second producing means rotates said cylindrical means to produce relative rotation between said cylindrical means and said arrays in the second direction.

4. The printer according to claim 1 in which:

said selecting means selects more than one of said nozzles in each of said arrays for printing one of the desired resolutions and only one of said nozzles in at least one of said arrays for printing other resolutions;

and means to control said selecting means in accordance with the resolution to be printed.

5. The printer according to claim 4 in which:

said first producing means moves said arrays in the first direction to produce relative linear motion between said cylindrical means and said arrays in the first direction;

and said second producing means rotates said cylindrical means to produce relative rotation between said cylindrical means and said arrays in the second direction.

6. An ink jet printer for selectively printing different resolutions on a medium comprising:

cylindrical means for supporting the medium for receiving ink drops;

a first set of arrays of ink jet nozzles disposed relative to said cylindrical means, each of said first set of arrays having a plurality of nozzles linearly spaced in a first direction to supply ink drops at a selected drop rate to the medium, said arrays being disposed relative to each other so that the tracks from each of said nozzles interlace with other tracks from other of said nozzles;

a second set of arrays of ink jet nozzles equally spaced from each other about the circumference of said cylindrical means, each of said second set of arrays having at least one nozzle to supply ink drops at a selected drop rate to the medium, each of said nozzles of said second set of arrays having a larger diameter than the nozzles of said first set of arrays;

means to control whether ink drops from said first set of arrays or said second set of arrays are applied to the medium in accordance with the desired resolution to be printed;

first producing means to produce relative linear motion between said cylindrical means and said arrays in the first direction;

second producing means to produce relative rotation between said cylindrical means and said arrays in a second direction substantially orthogonal to the first direction;

and means to alter at least two out of the velocity of said first producing means, the velocity of said second producing means, and the drop rate of the drops supplied in accordance with the resolution to be printed.

7. The printer according to claim 6 in which:

said first producing means moves said first and second sets of arrays in the first direction to produce relative linear motion between said cylindrical means and said first and second sets of arrays in the first direction;

and said second producing means rotates said cylindrical means to produce relative rotation between said cylindrical means and said first and second sets of arrays in the second direction.

8. The printer according to claim 6 including:

selecting means to select more than one of said nozzles in each of said first set of arrays for printing one of the desired resolutions and at least one of said nozzles in at least one of said second set of arrays for printing other of the desired resolutions;

and said control means includes means to control said selecting means in accordance with the resolution to be printed.

9. The printer according to claim 8 in which:

said first producing means moves said first and second sets of arrays in the first direction to produce relative linear motion between said cylindrical means and said first and second sets of arrays in the first direction;

and said second producing means rotates said cylindrical means to produce relative rotation between said cylindrical means and said first and second sets of arrays in the second direction.

10. The printer according to claim 6 in which each of said second set of arrays has a plurality of nozzles linearly spaced in the first direction.

11. The printer according to claim 10 including:

selecting means to select more than one of said nozzles in each of said second set of arrays for printing one of the desired resolutions, more than one of said nozzles in each of said first set of arrays for printing another of the desired resolutions, and at least one of said nozzles in at least one of said second set of arrays for printing other of the desired resolutions;

and said control means including means to control said selecting means in accordance with the resolution to be printed.

12. The printer according to claim 11 in which:

said first producing means moves said first and second sets of arrays in the first direction to produce relative linear motion between said cylindrical means and said first and second sets of arrays in the first direction;

and said second producing means rotates said cylindrical means to produce relative rotation between said cylindrical means and said first and second sets of arrays in the second direction.

13. An ink jet printer for selectively printing different resolutions on a medium comprising:

cylindrical means for supporting the medium for receiving ink drops;

a first set of arrays disposed relative to said cylindrical means, each of said first set of arrays having a plurality of nozzles linearly spaced in a first direction to supply ink drops at a selected drop rate to the medium, said arrays being disposed relative to each other so that the tracks from each of said nozzles interlace with other tracks from other of said nozzles;

at least one additional array having at least one nozzle to supply ink drops at a selected drop rate to the medium, each nozzle of said additional array having a larger diameter than the nozzles of said first array;

means to control whether ink drops from said first set of arrays or said additional array are applied to the medium in accordance with the resolution to be printed;

first producing means to produce relative linear motion between said cylindrical means and said arrays in the first direction;

second producing means to produce relative rotation between said cylindrical means and said arrays in a second direction substantially orthogonal to the first direction;

and means to alter at least two out the velocity of said first producing means, the velocity of said second producing means, and the drop rate of the drops supplied in accordance with the desired resolution to be printed.

14. The printer according to claim 13 in which:

said first producing means moves said arrays in the first direction to produce relative linear motion between said cylindrical means and said arrays in the first direction;

and said second producing means rotates said cylindrical means to produce relative rotation between said cylindrical means and said arrays in the second direction.

15. The printer according to claim 13 including:

selecting means to select more than one of said nozzles of each of said first set of arrays for printing one of the desired resolutions and at least one of said nozzles of said additional array for printing other resolutions;

and said control means including means to control said selecting means in accordance with the resolution to be printed.

16. The printer according to claim 15 in which:

said first producing means moves said arrays in the first direction to produce relative linear motion between said cylindrical means and said arrays in the first direction;

and said second producing means rotates said cylindrical means to produce relative rotation between said cylindrical means and said arrays in the second direction.

17. The printer according to claim 13 in which said additional array has a plurality of nozzles linearly spaced in the first direction.

18. The printer according to claim 17 including:

selecting means to select more than one of said nozzles in said additional array for printing one of the desired resolutions, more than one of said nozzles in each of said first set of arrays for printing another of the desired resolutions, and at least one of said nozzles in said additional array for printing other of the desired resolutions;

and said control means including means to control said selecting means in accordance with the resolution to be printed.

19. The printer according to claim 18 in which:

said first producing means moves said arrays in the first direction to produce relative linear motion between said cylindrical means and said arrays in the first direction;

and said second producing means rotates said cylindrical means to produce relative rotation between said cylindrical means and said arrays in the second direction.

* * * * *

UNITED STATES PATENT AND TRADEMARK OFFICE
CERTIFICATE OF CORRECTION

PATENT NO. : 4,097,873
DATED : June 27, 1978
INVENTOR(S) : V. C. Martin

Page 1 of 2

It is certified that error appears in the above-identified patent and that said Letters Patent are hereby corrected as shown below:

Column 4, line 8, change "seitch" to --switch--.

Column 9, line 17, change "gto" to --to--.

Column 13, line 15, change "control" to --$\overline{\text{control}}$--; line 18, change "control" to --$\overline{\text{control}}$--; line 21, change "control" to --$\overline{\text{control}}$--; line 35, change "B+N" to --B + W--.

Column 14, line 4, change "STD RES" to --$\overline{\text{STD RES}}$-- (two places);

Column 15, line 42, change "STD RES" to --$\overline{\text{STD RES}}$--; line 60, change "STD RES" to --$\overline{\text{STD RES}}$--; line 67, change "STD RES" to --$\overline{\text{STD RES}}$--.

Column 16, line 52, change "STD RES" to --$\overline{\text{STD RES}}$--; line 67, change "89-29" to --89-20--.

Column 17, line 52, change "D2, D4" to --$\overline{\text{D2}}$, $\overline{\text{D4}}$--; line 58, change "D1" to --$\overline{\text{D1}}$--; line 60, change "STD RES" to --$\overline{\text{STD RES}}$--.

Column 18, line 25, change "B8" to --$\overline{\text{B8}}$--; line 26, change "B16" to --$\overline{\text{B16}}$--; line 34, change "B16" to --$\overline{\text{B16}}$--; line 40, change "B1, B2, B8" to --$\overline{\text{B1}}$, $\overline{\text{B2}}$, $\overline{\text{B8}}$--; line 47, change "B2, B4" to --$\overline{\text{B2}}$, $\overline{\text{B4}}$--; line 54, change "B1" to --$\overline{\text{B1}}$--.

UNITED STATES PATENT AND TRADEMARK OFFICE
CERTIFICATE OF CORRECTION

PATENT NO. : 4,097,873
DATED : June 27, 1978
INVENTOR(S) : V. C. Martin

It is certified that error appears in the above-identified patent and that said Letters Patent are hereby corrected as shown below:

Column 19, line 26, change "E1, E2, E4" to $--\overline{E1}, \overline{E2}, \overline{E4}--$; line 32, change "E1, E4, E8" to $--\overline{E1}, \overline{E4}, \overline{E8}--$; line 38, change "E2, E4" to $--\overline{E2}, \overline{E4}--$; line 39, change "E8" to $--\overline{E8}--$; line 58, change "F1, F2, F4" to $--\overline{F1}, \overline{F2}, \overline{F4}--$; line 59, change "F16" to $--\overline{F16}--$; line 66, change "F1, F8, F16" to $-\overline{F1}, \overline{F8}, \overline{F16}--$; line 67, change "F32" to $--\overline{F32}--$.

Column 20, line 6, change "F4, F8, F16" to $--\overline{F4}, \overline{F8}, \overline{F16}--$; line 7, change "F32" to $--\overline{F32}--$.

Column 21, line 30, change "STD RES" to $--\overline{STD}\ \overline{RES}--$

Signed and Sealed this

Twenty-sixth Day of February 1980

[SEAL]

Attest:

SIDNEY A. DIAMOND

Attesting Officer

Commissioner of Patents and Trademarks